United States Patent
Joe et al.

(10) Patent No.: US 7,734,401 B2
(45) Date of Patent: Jun. 8, 2010

(54) SHIFT CONTROL SYSTEM OF A HYBRID TRANSMISSION WITH A MOTOR TORQUE CORRECTION

(75) Inventors: Shinichiro Joe, Yokohama (JP); Toshikazu Oshidari, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 482 days.

(21) Appl. No.: 10/986,197

(22) Filed: Nov. 12, 2004

(65) Prior Publication Data

US 2005/0102082 A1     May 12, 2005

(30) Foreign Application Priority Data

Nov. 12, 2003   (JP)   ............... 2003-382679

(51) Int. Cl.
    B60W 20/00    (2006.01)
(52) U.S. Cl. ............... 701/54; 701/51; 701/58; 903/902; 903/903; 903/906; 180/65.1; 180/65.21; 180/65.265; 180/65.285; 290/40 A; 477/2; 477/3
(58) Field of Classification Search ............ 701/22, 701/51–54, 64, 84, 87–88, 90, 95, 99–101, 701/200–226; 903/903–907, 915, 917–919, 903/940–945; 192/3.51, 3.54–3.55, 3.61, 192/103 R; 180/65.1, 65.21, 65.26, 65.28, 180/65.285; 290/40 A; 477/2, 3
See application file for complete search history.

(56) References Cited

U.S. PATENT DOCUMENTS

| | | | | |
|---|---|---|---|---|
| 5,275,267 A | * | 1/1994 | Slicker | 477/176 |
| 5,558,595 A | * | 9/1996 | Schmidt et al. | 477/3 |
| 5,887,670 A | * | 3/1999 | Tabata et al. | 180/65.25 |
| 6,018,694 A | * | 1/2000 | Egami et al. | 701/102 |
| 6,131,538 A | * | 10/2000 | Kanai | 123/2 |
| 6,356,817 B1 | * | 3/2002 | Abe | 701/22 |
| 6,600,980 B1 | * | 7/2003 | Kraska et al. | 701/22 |
| 7,228,925 B2 | * | 6/2007 | Hightower | 180/65.1 |
| 2002/0062183 A1 | * | 5/2002 | Yamaguchi et al. | 701/22 |
| 2002/0147530 A1 | * | 10/2002 | Tamagawa et al. | 701/22 |
| 2002/0179348 A1 | * | 12/2002 | Tamai et al. | 180/65.2 |
| 2003/0028311 A1 | * | 2/2003 | Seto et al. | 701/96 |
| 2004/0006414 A1 | * | 1/2004 | Suzuki | 701/22 |

FOREIGN PATENT DOCUMENTS

| | | |
|---|---|---|
| JP | 10-150703 (A) | 6/1998 |
| JP | 10-243503 (A) | 9/1998 |
| JP | 11-117782 (A) | 4/1999 |
| JP | 2000-115913 (A) | 4/2000 |
| JP | 2000-333304 (A) | 11/2000 |
| JP | 2002-058113 A | 2/2002 |
| JP | 2003-34153 (A) | 2/2003 |

* cited by examiner

Primary Examiner—Khoi Tran
Assistant Examiner—Spencer Patton
(74) Attorney, Agent, or Firm—Foley & Lardner LLP

(57) ABSTRACT

A shift control system of a hybrid transmission for a vehicle is arranged to correct ideal motor/generator torques so as to achieve a target engine speed prior to a target driving torque when an actual engine speed becomes greater than an allowable upper-limit engine speed and to correct the ideal motor/generator torque so as to achieve the target driving torque prior to the target engine speed when the actual engine speed does not become greater than the allowable upper-limit engine speed.

11 Claims, 12 Drawing Sheets

FIG.4

HEV

HEV RUNNING (ENGINE CLUTCH Cin = ON)

| MODE | Low-iVT | Low | Hi-iVT | Hi | 2nd |
|---|---|---|---|---|---|
| LOW & HIGH BRAKE ($B_{LH}$) | × | ○ | × | ○ | × |
| LOW BRAKE ($B_{LO}$) | ○ | ○ | × | × | ○ |
| HIGH CLUTCH (Chi) | × | × | ○ | ○ | ○ |

EV RUNNING (ENGINE CLUTCH Cin = OFF)

| MODE | EV-Low-iVT | EV-Low | EV-Hi-iVT | EV-Hi | EV-2nd |
|---|---|---|---|---|---|
| LOW & HIGH BRAKE ($B_{LH}$) | × | ○ | × | ○ | × |
| LOW BRAKE ($B_{LO}$) | ○ | ○ | × | × | ○ |
| HIGH CLUTCH (Chi) | × | × | ○ | ○ | ○ |

SHIFT CONTROL SYSTEM OF A HYBRID TRANSMISSION WITH A MOTOR TORQUE CORRECTION

BACKGROUND OF THE INVENTION

The present invention relates a hybrid drive system constructed by an internal combustion engine and a hybrid transmission including a differential mechanism and two motor/generators, and more particularly to a shift control system which appropriately executes a shift control of the hybrid transmission so as not to generate a strange acceleration/deceleration or an exceeding engine revolution due to an unnatural change of a driving torque or transmission ratio.

It is known that a hybrid transmission is generally constructed by relationally connecting an internal combustion engine, an output shaft, two motor/generators and a differential mechanism to execute a shifting through the control of the two motor/generators. Such a hybrid transmission is arranged to drive the motor/generators using electric power of a battery. Accordingly, it is necessary to limit the electric power used for the motor/generators at a value smaller than a rated electric power of the battery as is similar to the limitation of an electric device installed in a vehicle.

Japanese Published Patent Application No. 2002-058113 discloses a power control method of the motor/generators for a hybrid vehicle. More specifically, the power control method is basically applied to a power output system which comprises at least an electric device operated according to charging/discharging of a battery, and corrects a target output of the electric device at a value which requires a power smaller than a rated momentary electric power of the battery when the electric device outputs the target output requiring a power greater than the rated momentary electric power.

SUMMARY OF THE INVENTION

However, this method causes a problem in case that a power transmission mechanism using this method is arranged to output a combination force of the force generated by the two motor/generators (electric devices) and a force generated by the internal combustion engine to a driveline. That is, Japanese Published Patent Application No. 2002-058113 does not disclose a correction procedure of distributing the power of the motor/generators relative to the power of the engine although such a correction of a power distribution of the both motor/generators (electric devices) largely affects the driving torque outputted to an output-line and a transmission ratio in case of the hybrid transmission.

If the correction of the target output of the two motor/generators is determined without taking account of the influences of this correction of the power distribution on the driving force and the transmission ratio, there will cause a problem that the driving torque unnaturally is changed by this correction so as to give an unsuitable acceleration/deceleration feeling to a driver. Further when the engine operates at an allowable upper limit of an engine speed, there is a possibility that the transmission ratio changes so that the engine speed increases over the allowable upper limit.

It is therefore an object of the present invention to provide a shift control system of a hybrid transmission which system solves the above-discussed problem.

An aspect of the present invention resides in a shift control system of a hybrid transmission for a vehicle. The hybrid transmission is constructed by connecting an internal combustion engine, an output shaft, and two motor/generators through a differential mechanism. The shift control system comprises a target value setting section setting a target driving torque, a target engine speed and a target engine torque according to a vehicle driving condition; an engine torque detecting section obtaining an actual engine torque; an ideal motor torque calculating section calculating ideal motor/generator torques of the motor/generators so as to achieve the target driving torque and the target engine revolution speed, from the target driving torque, the target engine speed and an actual engine speed on the basis of an equation of motion of the output shaft; a motor torque correcting section correcting the ideal motor/generator torques within a realizable range indicative of a range of a combination of two torques capable of being generated by the motor/generators under present conditions of the motor/generators and a battery connected to the motor/generators when the combination of the ideal motor/generator torques is out of the realizable range; the motor torque correcting section correcting the ideal motor/generator torques so as to achieve the target engine speed prior to the target driving torque when the actual engine speed becomes greater than an allowable upper-limit engine speed; and the motor torque correcting section correcting the ideal motor/generator torque so as to achieve the target driving torque prior to the target engine speed when the actual engine speed does not become greater than the allowable upper-limit engine speed.

Another aspect of the present invention resides in a method of controlling a hybrid drive system constructed by a hybrid transmission and an internal combustion engine. The hybrid transmission being constructed by connecting an internal combustion engine, an output shaft, and two motor/generators through a differential mechanism. The method comprises an operation of setting a target driving torque, a target engine speed and a target engine torque according to a vehicle driving condition; an operation of obtaining an actual engine torque; an operation of calculating ideal motor/generator torques of the motor/generators so as to achieve the target driving torque and the target engine revolution speed, from the target driving torque, the target engine speed and an actual engine speed on the basis of an equation of motion of the output shaft; an operation of correcting the ideal motor/generator torques within a realizable range indicative of a range of a combination of two torques capable of being generated by the motor/generators under present conditions of the motor/generators and a battery connected to the motor/generators when the combination of the ideal motor/generator torques is out of the realizable range; an operation of correcting the ideal motor/generator torques so as to achieve the target engine speed prior to the target driving torque when the actual engine speed becomes greater than an allowable upper-limit engine speed; and an operation of correcting the ideal motor/generator torque so as to achieve the target driving torque prior to the target engine speed when the actual engine speed does not become greater than the allowable upper-limit engine speed.

A further aspect of the present invention resides in a hybrid drive system which comprises an internal combustion engine; an output shaft connect to a wheel driveline of a vehicle; two motor/generators receiving electric power from a battery; a differential mechanism relationally connecting the engine, the output shaft and the motor/generators; an accelerator opening detector detecting an accelerator opening; a vehicle speed detector detecting a vehicle speed; and a controller connected to the engine, the motor/generators, the accelerator opening detector and the vehicle speed detector. The controller is configured to determine a target driving torque, a target engine speed and a target engine torque according to the accelerator opening and the vehicle speed, to obtain an actual engine torque, to obtain ideal motor/generator torques for achieving the target driving torque and the target engine speed, from the target driving torque, the target engine speed and the actual engine speed, to correct the ideal motor/generator torques within a motor torque generable range limited by a condition of the battery when the ideal torque becomes out of the motor torque generable range, to correct the ideal motor/generator torques so as to achieve the target driving torque prior to the target engine speed when the actual engine speed does not exceed an allowable upper limit of the actual engine speed, to correct the ideal motor/generator torques so as to achieve the target engine speed prior to the target engine speed when the actual engine speed exceeds the allowable upper limit.

The other objects and features of this invention will become understood from the following description with reference to the accompanying drawings.

BRIEF DESCRIPTION OF THE DRAWINGS

FIG. 4 is a logic diagram showing a relationship between a selected mode of the hybrid transmission receiving an engine power and engagement/disengagement states of brakes and clutches.

FIG. 5 is a logic diagram showing a relationship between a selected mode of the hybrid transmission receiving only motor power and engagement/disengagement states of brakes and clutches.

DETAILED DESCRIPTION OF THE INVENTION

Hereinafter, there is discussed embodiments of a shift control system according to the present invention with reference to the drawings.

Figure 1:
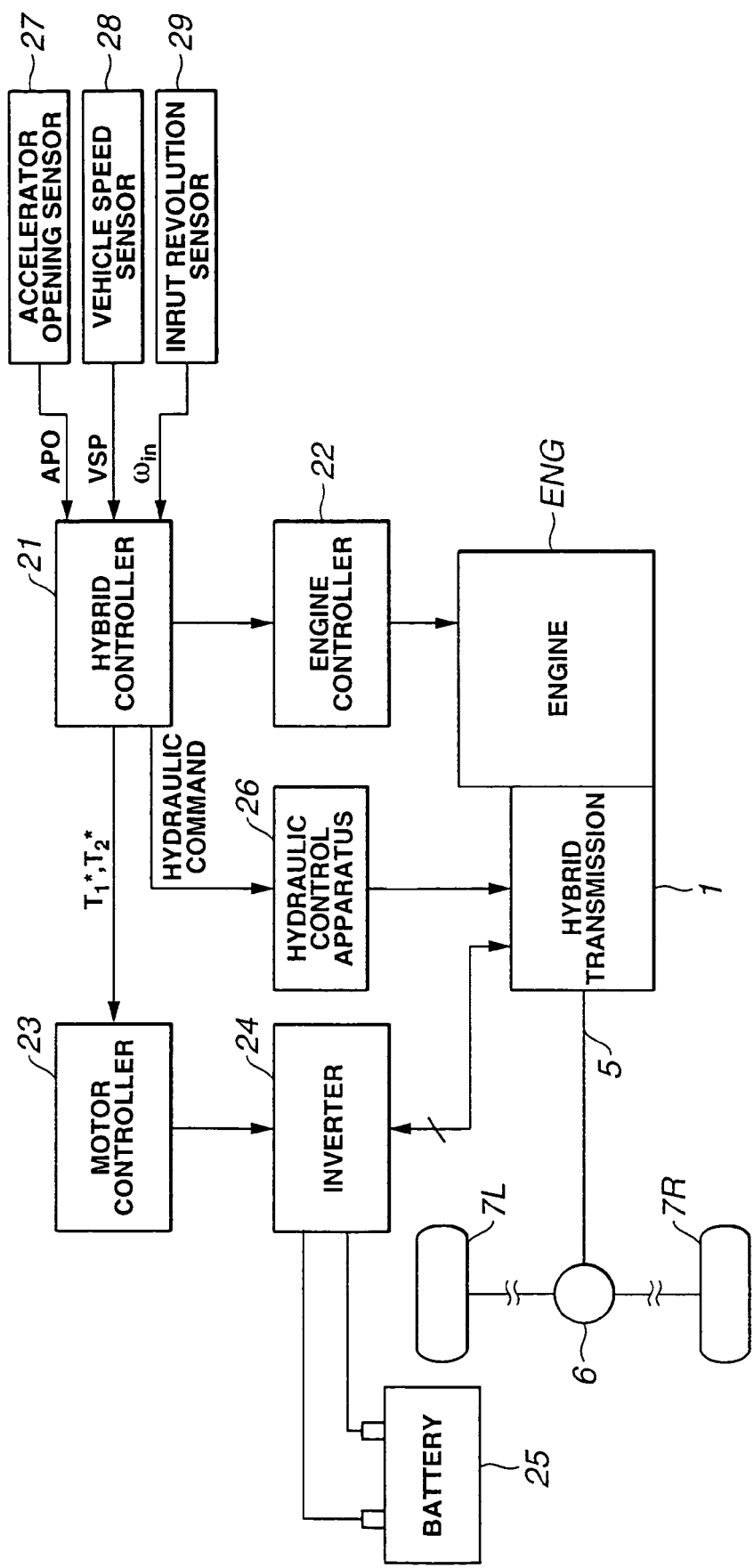
FIG. 1 is a schematic system view showing a control system of a hybrid drive system which comprises a shift control system of a hybrid transmission according to a first embodiment of the present invention.

FIG. 1 shows a hybrid drive system which is for an automotive vehicle and comprises an internal combustion engine ENG and a hybrid transmission 1. A control system of hybrid transmission 1 comprises an embodiment of the shift control system according to the present invention. Hybrid transmission 1 is used as a transmission of a rear-drive vehicle and is constructed as shown in FIG. 2.

Figure 2:
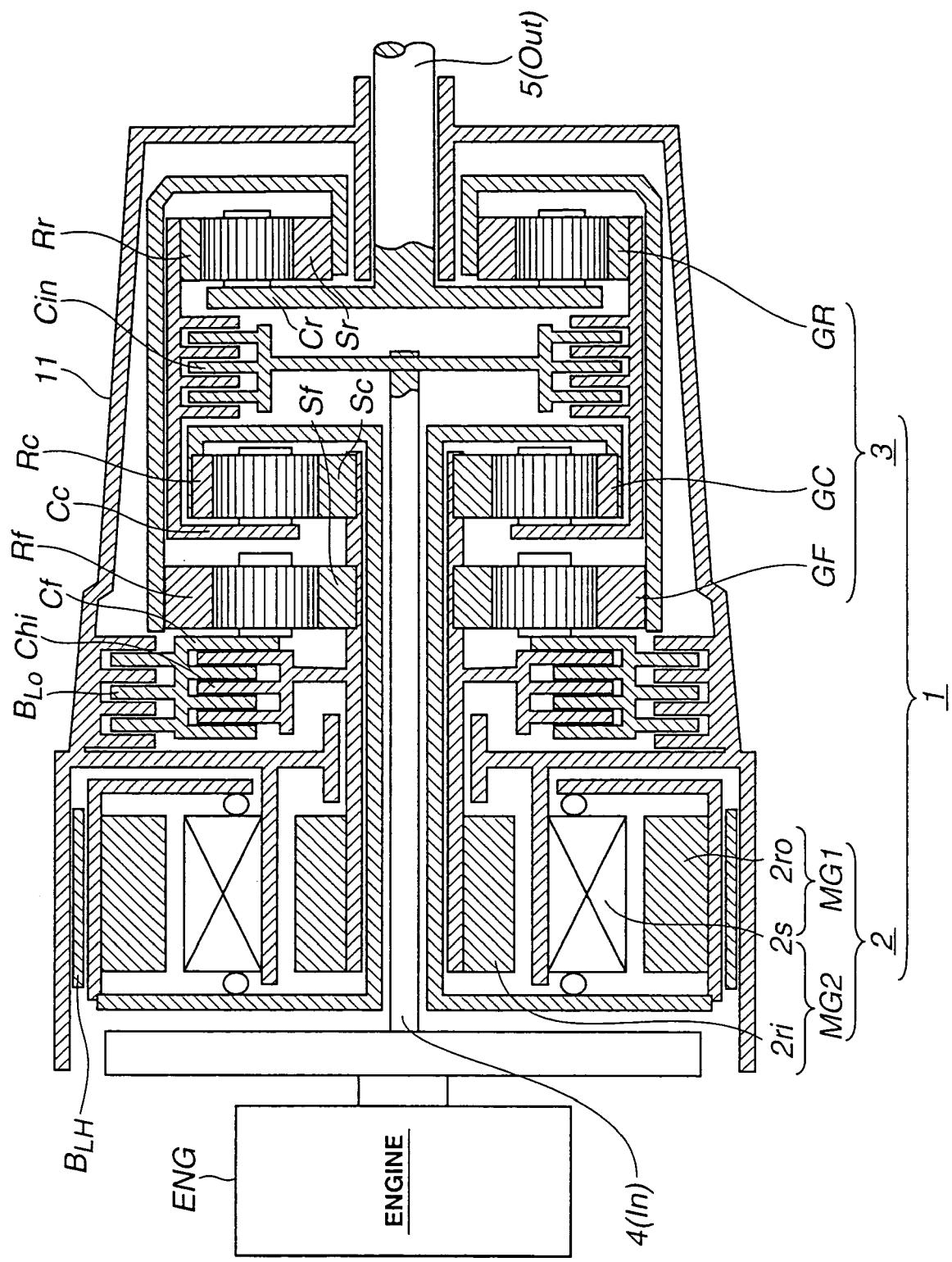
FIG. 2 is a cross-sectional view of the hybrid transmission of FIG. 1.

As shown in FIG. 2, hybrid transmission 1 comprises a transmission case 11 and three simple planetary gearsets GF, GC and GR disposed in transmission case 11. More specifically, front simple planetary gearset GF, center simple planetary gearset GC and rear simple planetary gearset GR are disposed in transmission case 11 so as to be coaxially arranged from a rear end apart from an engine ENG (a right hand side in FIG. 2) to a front end near engine ENG (a left hand side in FIG. 2) in order of mention. A compound-current two-layer motor 2 (motor/generator set) is also disposed in transmission case 11 so as to be coaxial with planetary gearsets GF, GC and GR.

Front, center and rear planetary gearsets GF, GC and GR are correlated so as to construct a differential mechanism 3 of three-degree-of-freedom, as follows.

Front planetary gearset GF comprises a sun gear Sf, a ring gear Rf and a carrier Cf. Center planetary gearset GC comprises a sun gear Sc, a ring gear Rc and a carrier Cc. Rear planetary gearset GR comprises a sun gear Sr, a ring gear Rr and a carrier Cr.

Ring gear Rr is relationally connected to carrier Cc. An input shaft 4, through which the revolution of engine ENG is inputted to hybrid transmission 1, is connected to the coupled member of ring gear Rr and carrier Cc through an engine clutch Cin. An output shaft 5 is connected to carrier Cr. In a lever diagram of FIG. 3, input shaft 4 is denoted as an input, and output shaft 5 is denoted as an output Out.

Compound-current two-layer motor 2 is constructed such that an inner rotor $2ri$ and an annular outer rotor $2ro$ around inner rotor $2ri$ are coaxially and rotatably supported in transmission case 11. An annular stator $2s$ is disposed at an annular space between inner rotor $2ri$ and outer rotor $2ro$ so as to be coaxial with inner rotor $2ri$ and outer rotor $2ro$, and is fixed to transmission case 11.

Annular stator $2s$ and outer rotor $2ro$ construct a first motor/generator (outside motor/generator) MG1, and annular stator $2s$ and inner rotor $2ri$ construct a second motor/generator (inside motor/generator) MG2.

Each of first and second motor/generators MG1 and MG2 independently functions as a motor which outputs a rotational force having a revolution direction corresponding to a current direction and a revolution speed (including a stopping state) corresponding to the magnitude of the supplied current when compound current is supplied to each of first and second motor/generators MG1 and MG2. Further, each of first and second motor/generators MG1 and MG2 independently functions as a generator which outputs an electric power corresponding to the magnitude of torque of an applied external force when no compound current is supplied to each of first and second motor/generators MG1 and MG2.

First motor/generator MG1 (outer rotor $2ro$) is connected to ring gear Rc, and second motor/generator MG2 (inner rotor $2ri$) is connected to sun gears Sf and Sc. A high clutch Chi is disposed between sun gears Sf and carrier Cf so as to integrally connect sun gear Sf and carrier Cf. A low brake $B_{LO}$ is disposed between carrier Cf and transmission case 11 so as to be capable of fixing carrier Cf to transmission case 11. Ring gear Rf is connected to sun gear Sr.

A low & high brake $B_{LH}$ of a band brake type is disposed around outer rotor $2ro$ so that ring gear Rc is fixable to transmission case 11 through outer rotor $2ro$.

The degree of freedom as to the revolution of differential mechanism 3 is three. However, differential mechanism 3 is actually used by putting at least one of low brake $B_{LO}$, high clutch Chi and low & high brake $B_{LH}$ in an engaged state, and therefore the degree of freedom as to differential mechanism 3 is actually 2 or less. Accordingly, the revolution speeds of all rotational elements of differential mechanism 3 are determined by determining the revolution speeds of at least two of all rotational elements.

Hybrid transmission 1 of the first embodiment is disposed fore-and-aft at a backward of engine ENG so as to be coaxial with engine EGN.

As shown in FIG. 1, output shaft 5 drivingly connected to right and left wheels 7R and 7L through a differential gear device 6.

A control system for engine ENG and hybrid transmission 1 is constructed as shown in FIG. 1.

More specifically, a hybrid controller 21 totally controls engine ENG, hybrid transmission 1 including motor/generators MG1 and MG2, engine clutch Cin, low brake $B_{LO}$, high clutch Chi and low & high brake $B_{LH}$. Hybrid controller 21 outputs a command concerning a target engine torque $T_E^*$ of engine ENG to an engine controller 22. Engine controller 22 controls engine ENG according to the command so as to achieve the target engine torque $T_E^*$.

Hybrid controller 21 further outputs a command concerning ideal torques $T_1^*$ and $T_2^*$ of first and second motor/generators MG1 and MG2 to a motor controller 23. Motor controller 23 controls motor/generators MG1 and MG2, an inverter 24 and a battery 25 according to the command so as to achieve ideal torque $T_1^*$ and $T_2^*$.

Further, hybrid controller 21 outputs hydraulic commands for controlling the engagement and disengagement of engine clutch Cin, low brake $B_{LO}$, high clutch Chi and low & high brake $B_{LH}$ of hybrid transmission 1 to a hydraulic control apparatus 26. Hydraulic control apparatus 26 supplies hydraulic pressures corresponding to the hydraulic command to engine clutch Cin, low brake $B_{LO}$, high clutch Chi and low & high brake $B_{LH}$ of hybrid transmission 1 to execute the engagement and disengagement controls thereof.

Hybrid controller 21 receives signals from an accelerator opening sensor 27 of detecting an accelerator pedal depression quantity (accelerator opening) APO, a vehicle speed sensor 28 of detecting a vehicle speed VSP which is in proportion to a revolution speed $\omega_o$ of output shaft 5, and an input revolution sensor 29 of detecting a revolution speed $\omega_{IN}$ inputted to ring gear Rr (carrier Cc).

Hybrid controller 21 outputs the commands indicative of ideal motor/generator torques $T_1^*$ and $T_2^*$ to motor controller 23 and the command indicative of target engine torque $T_E^*$ to engine controller 22 so as to achieve a driving control intended by a driver according to the input information including accelerator opening APO, input revolution speed $\omega_{in}$ (engine speed $\omega_E$) and vehicle speed VSP.

Figure 3:
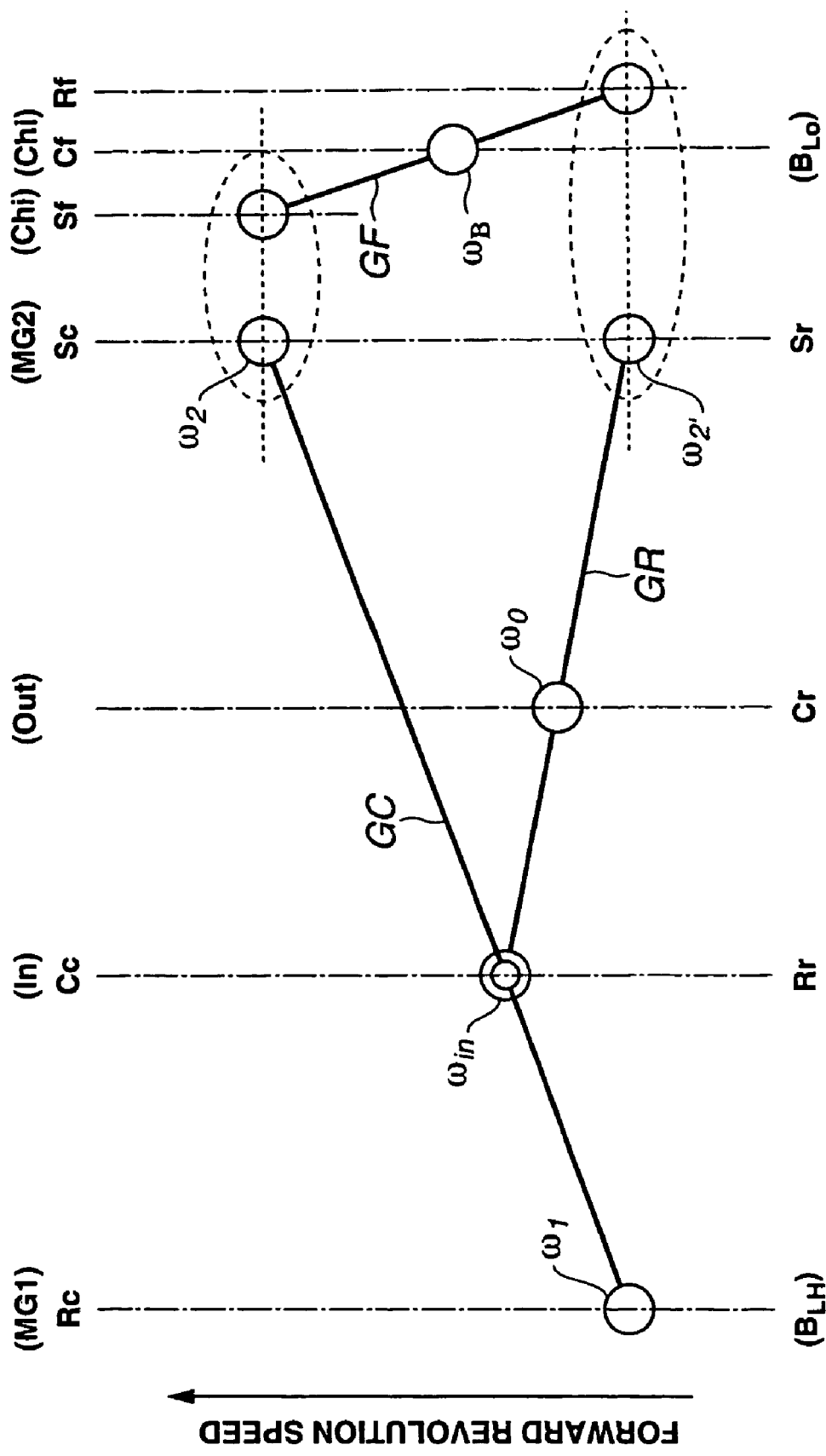
FIG. 3 is a lever diagram of the hybrid transmission shown in FIG. 2.

Hybrid transmission 1 arranged as shown in FIG. 2 is represented by a lever diagram shown in FIG. 3. The order of revolution speeds of elements of center planetary gearset GC is ring gear Rc, carrier Cc and sun gear Sc. The order of revolution speeds of elements of rear planetary gearset RG is ring gear Rr, carrier Cr and sun gear Sr.

Carrier Cc, whose order of revolution speed in center planetary gearset GC is second (intermediate), is relationally connected to ring gear Rr, whose order of revolution speed in rear planetary gearset GR is first. Sun gear Sr, whose order of revolution speed in rear planetary gearset GR is third, is relationally connected to ring gear Rf of front planetary gearset GF. Sun gear Sc, whose order of revolution speed in center planetary gearset Sc is first, is relationally connected to sun gear Sf of front planetary gearset GF.

Low brake $B_{LO}$ is provided so as to be capable of fixing carrier Cf of front planetary gearset GF to transmission case 11, and high clutch Chi is provided so as to releasably connect carrier Cf to sun gear Sf.

Ring gear Rc of center planetary gearset GC is connected to first motor/generator MG1. Carrier Cc of center planetary gearset GC and ring gear Rr of rear gear Rr of rear planetary gearset GR are connected to input shaft 4 (input In from engine ENG). Carrier Cr of rear planetary gearset GR is connected to output shaft 5 (output Out to the driveline). Sun gear Sc of center planetary gearset GC and sun gear Sf of front planetary gearset GF are connected to second motor/generator MG2.

Further, ring gear Rc of center planetary gearset GC is fixable to transmission case 11 by means of low & high brake $B_{LH}$.

The hybrid transmission represented by the lever diagram shown in FIG. 3 is arranged such that when carrier Cf and sun gear Sf of front planetary gearset GF are connected with each other by the engagement of high clutch Chi, all rotational elements of front planetary gearset GF integrally rotate. That is, the lever relating to front planetary gearset GF is vertically movable while keeping a horizontally aligned state, and therefore the position of sun gear Sr corresponds with the positions of sun gears Sf and Sc vertically.

Under this condition, the lever of rear planetary gearset GR overlaps with the lever of center planetary gearset GC. Accordingly a gear train constructed by center and rear planetary gearsets GC and GR is represented by a lever diagram of one line having the two-degree-of-freedom of four elements. In the order of revolution speeds of rotational elements, first motor/generator MG1, input In from engine ENG, output Out to the wheel driveline and second motor/generator MG2 are aligned.

When a shift mode (Hi-iVT mode) of engaging high clutch Chi is selected, it becomes possible to determine the output while freely selecting a revolution speed ratio between input revolution and output revolution and controlling both of the transmission ratio and the driving force, through the control of first and second motor/generators MG1 and MG2. Accordingly, Hi-iVT mode is a mode of enabling a continuous variation of the transmission ratio.

When a shift mode (Low-iVT mode) of fixing carrier Cf by operating low brake $B_{LO}$ is selected, sun gear Sr inversely rotates relative to sun gears Sc and Sf, and the revolution speed of sun gear Sr is determined from a ratio between the number of teeth of ring gear Rf and the number of teeth of sun gear Sf and the revolution speed of sun gear Sf, as shown by the lever of front planetary gearset GF in FIG. 3.

Accordingly, the revolution speed of output Out connected to carrier Cr decreases as compared with that in Hi-iVT mode, as is apparent from FIG. 3. That is, Low-iVT mode is used in a range where the transmission ratio is a low-side transmission ratio including a reverse transmission ratio as compared with the transmission ratio at which the revolution speeds of sun gears Sc and Sf become 0.

Herein, if the reverse revolution speed of ring gear Rf is increased by increasing the right revolution speed of sun gear Sc through the control of second motor/generator MG2 under a condition that the revolution speed $\omega_{in}$ of input In is kept constant, the reverse revolution speed of sun gear Sr connected to ring gear Rf increases and the revolution speed $\omega_o$ of output Out decreases. This enables the transmission ratio to be changed to a low-side, and further to be changed from the transmission ratio of a low-side infinite (stop state) to the reverse transmission ratio.

Even when Low-iVT mode of engaging low brake $B_{LO}$ is selected, it is possible to determine the output while freely selecting a revolution speed ratio between input revolution speed $\omega_{in}$ and output revolution speed $\omega_o$ and controlling both of the transmission ratio and the driving force through the control of motor/generators MG1 and MG2.

When a shift mode (Hi mode) of fixing ring gear Rc through outer rotor 2ro is selected by engaging low & high mode brake $B_{LH}$ in Hi-iVT mode, it becomes possible to fix a high-side transmission ratio in Hi mode. This enables a high-speed running of operating only engine ENG at this fixed high-side transmission ratio, an assist of the driving force using second motor/generator MG2 and an energy recovery through regenerative braking during a vehicle deceleration. Accordingly, the Hi mode can achieve both of a high-speed drivability and a fuel consumption improvement.

That is, when Hi mode of engaging low & high brake $B_{LH}$ in Hi-iVT mode is selected, it becomes possible to control the power of second motor/generator MG2 and to add the power of second motor/generator MG2 on the engine power under a condition that the revolution speed ratio between input revolution speed $\omega_{in}$ and output revolution speed $\omega_o$ is fixed. This Hi mode is a fixed transmission ratio mode.

When a shift mode (Low mode) of fixing ring gear Rc by engaging low & high brake BLH in Low-iVT mode is selected, it becomes possible to fix a low-side transmission ratio in Low mode. This enables a low-speed large-torque running using a large driving force obtained by summing the output of engine ENG and the output of second motor/generator MG2 while selecting a fixed low-side transmission ratio.

If second motor/generator MG2 is used as a generator in this case, it becomes possible to execute a running using the output obtained by subtracting the load of the generator from the engine output.

When Low mode of engaging low & high brake $B_{LH}$ in Low-iVT mode is selected, it becomes possible to control the power of second motor/generator MG2 and to add the power of second motor/generator MG2 on the engine power under a condition that the revolution speed ratio between input revolution speed $W_{in}$ and output revolution speed $\omega_o$ is fixed. This Low mode is also a fixed transmission ratio mode.

When a shift mode (2 nd mode) of fixing carrier Cf by operating low brake $B_{LO}$ and of connecting sun gear Sf and carrier Cf by operating high clutch Chi, both revolution speeds of sun gears Sr and Sc become 0. The lever of rear planetary gearset GR overlaps with the lever of center planetary gearset GC, and a gear train constructed by center and rear planetary gearsets GC and GR is represented by a lever diagram of one line having the two-degree-of-freedom of four elements. Further, the revolution speeds of sun gears Sr and Sc are fixed at the revolution speed of input In.

Accordingly, it becomes possible to set the transmission ratio at 2nd transmission ratio between Hi mode and Low mode and to execute a middle-speed running using the output of engine ENG and/or the output of first motor/generation at this fixed 2nd transmission ratio.

When 2nd mode of engaging both of low brake $B_{LO}$ and high clutch Chi is selected, it becomes possible to control the power of first motor/generator MG1 and to add the power of first motor/generator MG1 on the engine power under a condition that the revolution speed ratio between input revolution speed $\omega_{in}$ and output revolution speed $\omega_o$ is fixed. This 2nd mode is also a fixed transmission ratio mode.

As discussed above, two continuously variable transmission ratio modes and three fixed transmission ratio modes, which are selected by properly combining the engagement and disengagement of low brake $B_{LO}$, high clutch Chi and high & low brake $B_{LH}$ are shift modes selected during the hybrid (HEV) running wherein both of the power of engine ENG and the power of first and second motor/generators MG1 and MG2 are available by engaging engine clutch Cin. The relationship of the selected shift modes and the combination of engagement and disengagement of low brake $B_{LO}$, high clutch Chi and low & high brake $B_{LH}$ is shown in FIG. 4. In FIG. 4, mark o denotes an engagement state, and mark x denotes a disengagement state.

When an electric vehicle (EV) mode where the vehicle runs only by the power of motor/generators MG1 and MG2 by disengaging engine clutch Cin, the shift modes thereof are similarly selected as shown in FIG. 5. In FIG. 5, mark o also denotes engagement state, and mark x also denotes a disengagement state. the shift mode during EV running is denoted by adding EV- at a head of each shift mode name.

Figure 6:
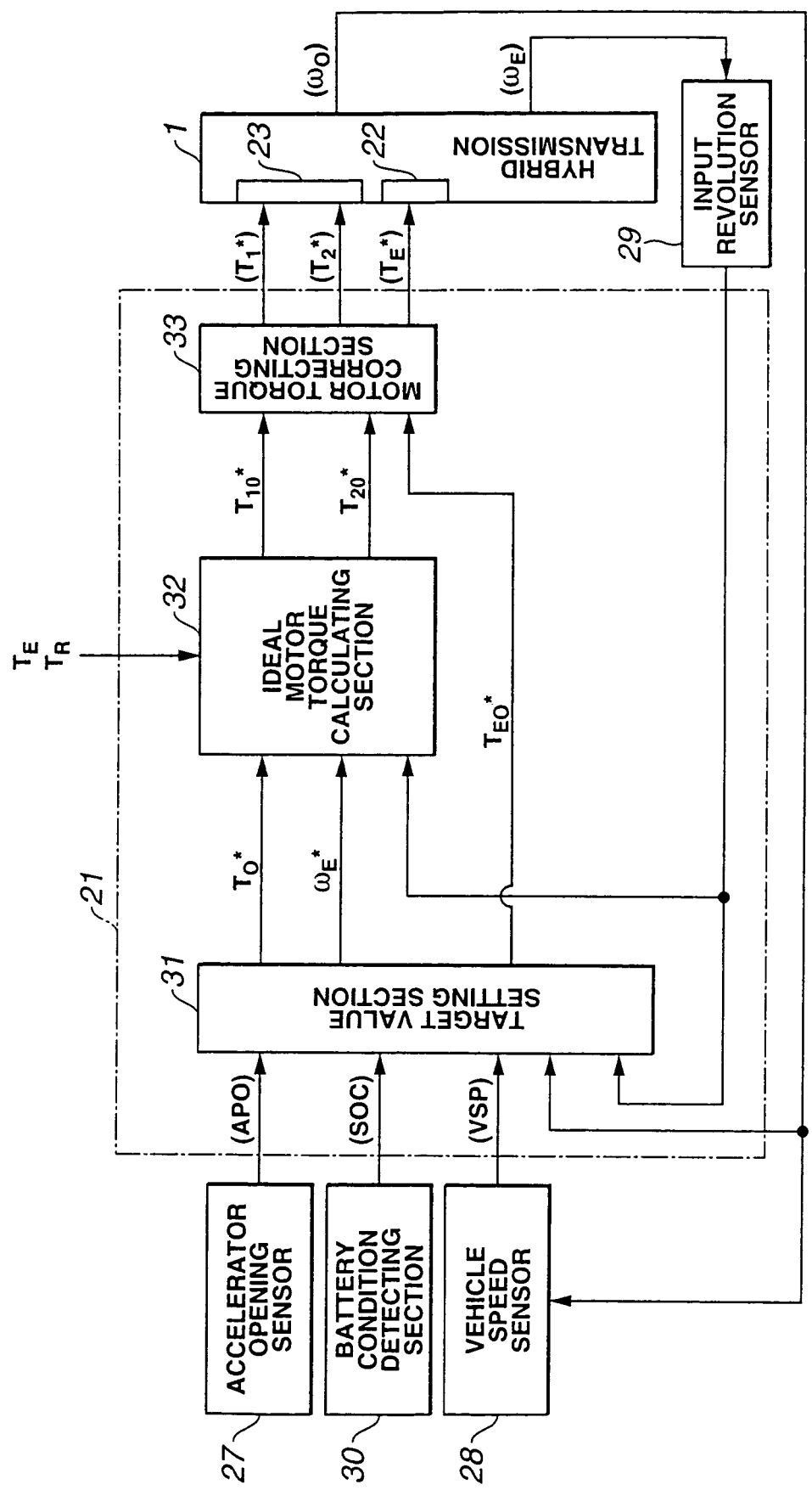
FIG. 6 is a block diagram showing functions executed during the shift control under the continuously variable transmission ratio mode by a hybrid controller shown in FIG. 1.

As is apparent from FIGS. 5 and 6, the shift mode having (-iVT) at the tail of the name is a continuously variable transmission ratio mode, and the shift mode having none of (-iVT) at the tail of the name is the fixed transmission ratio mode.

Differential mechanism 3 constructed by three planetary gearsets GF, GC and GR has three-degree-of-freedom in revolution. However, when the continuously variable transmission ratio mode (Low-iVT, Hi-iVT, EV-Low-iVT and EV-Hi-iVT) is selected, differential mechanism 3 takes two-degree-of-freedom in revolution due to the engagement of one of low brake $B_{LO}$ and high clutch Chi as shown in FIGS. 4 and 5.

When the fixed transmission ratio mode (Low, Hi, 2nd, EV-Low, EV-Hi and EV-2nd) is selected, differential mechanism 3 takes one-degree-of-freedom in revolution due to the engagement of low & high brake $B_{LH}$ and one of low brake $B_{LO}$ and high clutch Chi.

If it is intended to achieve a target driving torque and a target engine speed according to the driving condition of the vehicle during the continuously variable transmission ratio mode, there is a possibility that the ideal motor/generator torque generated by first and second motor/generator MG1 and MG2 becomes greater than a maximum torque corresponding to a battery chargeable/dischargeable electric power of the battery and/or a mechanically operable range of motor/generators MG1 and MG2. In such a situation, the ideal motor/generator torque is basically corrected within an operable range. This correcting operation is executed so as to achieve one of the target driving torque and the target engine speed with a higher priority, in order to solve the above discussed problem.

Hereinafter, there is discussed a shift control of hybrid transmission 1 in the continuously variable transmission ratio mode.

When the shift control in the continuously variable transmission ratio mode is executed, hybrid controller 21 of FIG. 1 is represented by a functional block diagram of FIG. 6. More specifically, hybrid controller 21 is constructed by a target value setting section 31 corresponding to target value setting means of the present invention, an ideal motor torque calculating section 32 corresponding to ideal motor torque calculating means of the present invention, and a motor torque correcting section 33 corresponding to motor torque correcting means of the present invention.

Target value setting section 31 sets a target driving torque $T_o^*$, a target engine speed $\omega_E^*$ and a target engine torque $T_{EO}^*$ based on accelerator opening APO detected by accelerator opening sensor 27, vehicle speed VSP detected by vehicle speed sensor 28, an input revolution speed $\omega_{in}$ (=engine speed $\omega_E$) detected by input revolution sensor 29 and a battery storage state SOC (state of charge) detected by battery state detecting section 30.

Vehicle speed sensor 28 obtains vehicle speed VSP from the output revolution speed $\omega_o$ using the following expression (1).

$$VSP = k_v \omega_o \tag{1}$$

where $k_v$ is a constant determined by a tire radius and a final gear ratio.

Figure 7:
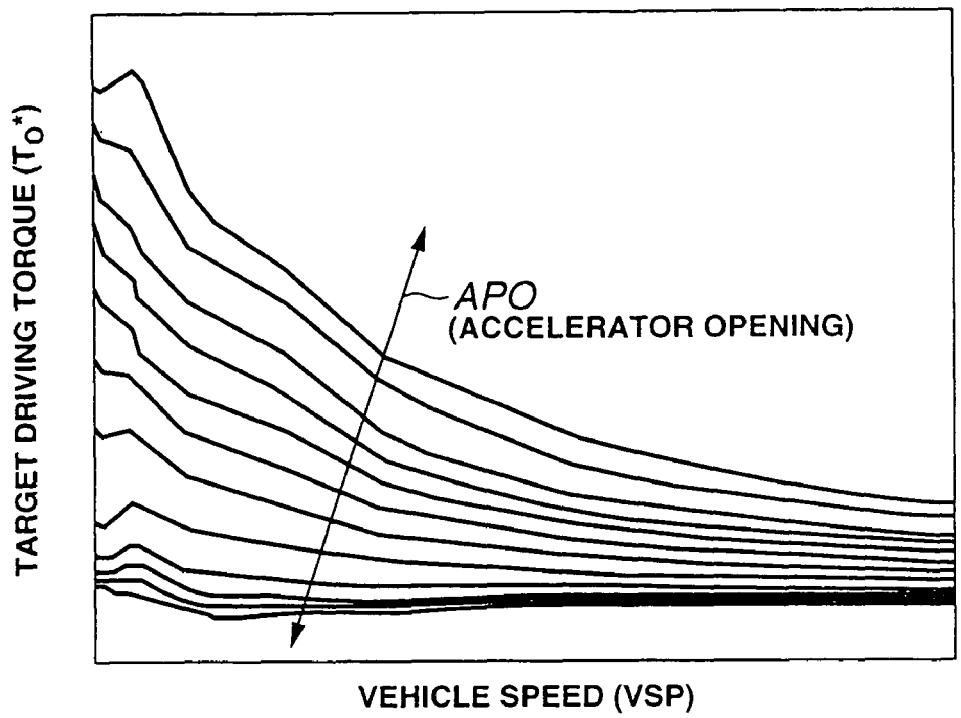
FIG. 7 is a graph showing characteristics of a target driving torque of the vehicle.

Firstly, there is discussed the setting of target driving torque $T_o^*$. Target driving torque $T_o^*$ at transmission output shaft 5 is retrieved from a target driving torque map shown in FIG. 7 with reference to accelerator opening APO and vehicle speed VSP.

Subsequently, there is discussed a setting of target engine speed. A target driving power $P_o^*$ is calculated from target driving torque $T_o^*$ and output revolution speed $\omega_o$ using the following expression (2).

$$P_o^* = \omega_o T_o^* \tag{2}$$

A target battery charging/discharging electric power $P_B^*$ is determined from SOC (State of Charge) of battery 25 so as to increase the battery discharging electric power as SOC becomes higher and to increase the battery charging electric power as SOC becomes lower. Target battery charging/discharging electric power $P_B^*$ takes a negative value when the battery is charged.

Further, a target engine power $P_E^*$ is obtained from target driving power $P_o^*$ and target battery charging/discharging electric power $P_B^*$ using the following expression (3).

$$P_E^* = P_o^* - P_B^* \tag{3}$$

Figure 8:
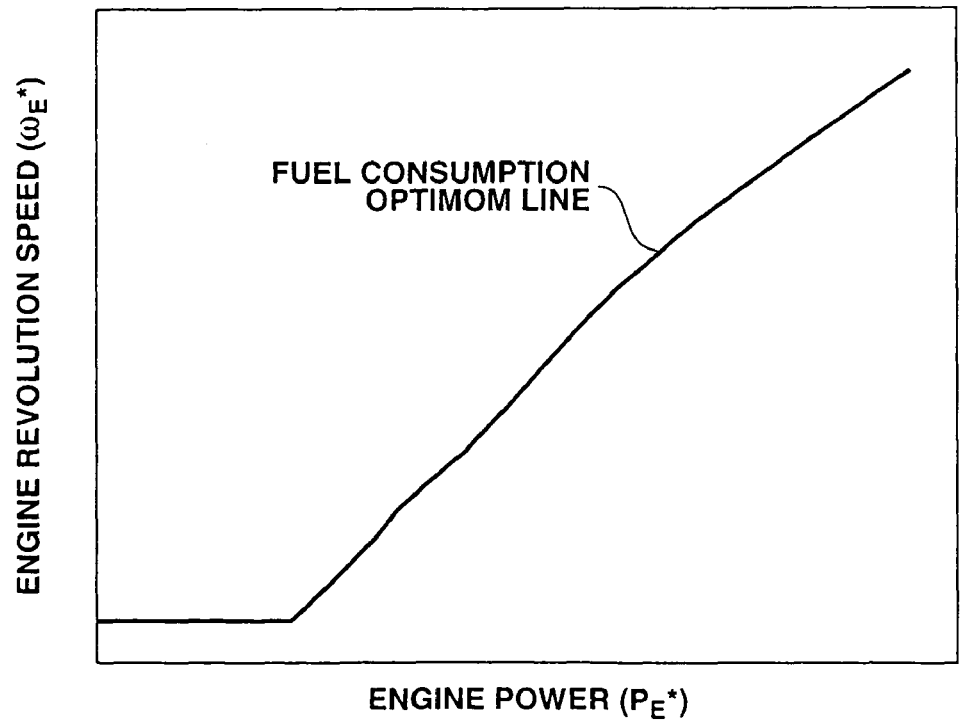
FIG. 8 is a graph showing a relationship between the engine power under an optimal fuel consumption condition and the engine speed.

Target engine speed $\omega_E^*$ for outputting target engine power $P_E^*$ while keeping an optimal fuel consumption of engine ENG is retrieved from an optimal fuel-consumption engine-speed map shown in FIG. 8 with reference to target engine power $P_E^*$.

Subsequently, there is discussed a setting of target engine torque $T_{EO}^*$.

It is preferable that target engine torque $T_{EO}^*$ is set at a value obtained by dividing target engine power $P_E^*$ by target engine speed $\omega_E^*$ so that target engine power $P_E^*$ is outputted at an operating point at which engine ENG performs the optimal fuel consumption.

However, there is a case that motor torque correcting section 33 limits an engine rotational acceleration during the shift transition. Such a limiting of the engine rotational acceleration prevents the realization of target engine speed $\omega_E^*$. As a result, it becomes difficult to obtain target engine power $P_E^*$.

In order to solve this difficulty, target engine torque $T_{EO}^*$ is set at a value obtained by dividing target engine power $P_E^*$ by actual engine speed $\omega_E$ as shown by the following expression (4).

$$T_{Eo}^* = \frac{P_E^*}{\omega_E} \tag{4}$$

where if target engine speed $\omega_E^*$ corresponds to actual engine speed $\omega_E$, the engine torque gains the optimal fuel consumption.

At ideal motor torque calculating section 32 in FIG. 6, an ideal motor torque of achieving both of target engine speed $\omega_E^*$ and target driving torque $T_o^*$ without limiting the motor/generator torque.

The following expressions (5), (6) and (7) represent a control rule for calculating an ideal first motor/generator torque $T_1^*$ and an ideal second motor/generator torque $T_2^*$ for achieving target engine speed $\omega_E^*$ and target driving torque $T_o^*$.

$$\begin{bmatrix} T_1^* \\ T_2^* \end{bmatrix} = \begin{bmatrix} b_{13} & b_{14} \\ b_{23} & b_{24} \end{bmatrix}^{-1} \left( \begin{bmatrix} u_i^* \\ T_o^* \end{bmatrix} - \begin{bmatrix} 0 & 0 \\ b_{21} & b_{22} \end{bmatrix} \begin{bmatrix} eT_R \\ dT_E \end{bmatrix} \right) \tag{5}$$

$$u_i^* = K \frac{\sigma}{|\sigma| + \varepsilon} \tag{6}$$

$$\sigma = \omega_E^* - \omega_E \tag{7}$$

where K is a positive constant determined by a latter discussed standard, $\varepsilon$ is a positive constant for continuing $u_i$ in the neighborhood of zero, $b_{12}$, $b_{14}$, $b_{21}$, $b_{22}$, $b_{23}$ and $b_{24}$ are constants determined by engine ENG, motor/generators MG1 and MG2, a rotational inertia of a differential-mechanism revolution system, a vehicle inertia and gear ratios of planetary gearsets GF, GC and GR. Further, $eT_r$ is an estimated value of a running resistance torque, $dT_E$ is a detection value of the engine torque. Estimated value $eT_R$ of running resistance torque is estimated using an observer or a pre-measured map.

There is discussed the derivation of the above-discussed control rule.

An equation of state as to a power train rotational system of a vehicle equipped with hybrid transmission 1 is represented by the following expressions (8) and (9) using engine speed $\omega_E$ and transmission output revolution speed $\omega_o$ as state quantities.

$$\frac{d\omega_E}{dt} = b_{11} T_R + b_{12} T_E + b_{13} T_1 + b_{14} T_2 \tag{8}$$

$$\frac{d\omega_o}{dt} = b'_{21} T_R + b'_{22} T_E + b'_{23} T_1 + b'_{24} T_2 \tag{9}$$

where $b_{11}$, $b_{12}$, $b'_{21}$, $b'_{22}$, $b'_{23}$ and $b'_{24}$ are constants determined by engine ENG, motor/generators MG1 and MG2, a rotational inertia of the differential-mechanism rotational system, a vehicle inertia, gear ratios of front, center and rear planetary gearsets GF, GC and GR, $T_R$ is a running resistance torque, $T_E$ is the engine torque, $T_1$ is first motor/generator torque, $T_2$ is second motor/generator torque.

Firstly, there is discussed the following expression (10) which shows that the engine speed follows the target engine speed under the control rule represented by the expression (5).

$$f = \frac{1}{2} \sigma^2 \tag{10}$$

By differentiating both sides of the expression (10) with respect to time, the following expression (11) is obtained.

$$\frac{df}{dt} = \sigma \frac{d\sigma}{dt} \quad (11)$$

If $\omega_E^*$ is almost constant, a relationship expressed by the following expressions (12) and (13) is obtained.

$$\frac{d\sigma}{dt} = -\frac{d\omega_E}{dt} \quad (12)$$

$$\frac{d\sigma}{dt} = -b_{11}T_R - b_{12}T_E - b_{13}T_1 - b_{14}T_2 \quad (13)$$

Herein, $u_i$ is defined as follows.

$$u_i = b_{13}T_1 + b_{14}T_2 \quad (14)$$

The following expression (15) is obtained from the expressions (13) and (14).

$$\frac{d\sigma}{dt} = -b_{11}T_R - b_{12}T_E - u_i \quad (15)$$

The following expression (16) is obtained from the expressions (11) and (15).

$$\frac{df}{dt} = -\sigma(b_{11}T_R + b_{12}T_E + u_i) \quad (16)$$

By setting K so as to be greater than the maximum value of the absolute value of $(b_{11}T_R + b_{12}T_E)$ from the expressions (6), (7) and (16), when $\sigma$ is sufficiently large such that $u_i \cong K$, df/dt takes a negative value, and f takes a positive value. Since df/dt is negative, f is converged into the neighborhood of 0.

Hereinafter, there is shown an equation of motion as to transmission output shaft 5.

$$I_o \frac{d\omega_o}{dt} = T_o - T_R \quad (17)$$

where $I_o$ is a rotational inertia including a vehicle inertia from the output shaft to tires.

The following expression (18) is obtained from the expressions (9) and (17).

$$T_o = (I_c b'_{21} + 1)T_R + I_c b'_{22}T_E + I_c b'_{23}T_1 + I_c b'_{24}T_2 \quad (18)$$
$$= b_{21}T_R + b_{22}T_E + b_{23}T_1 + b_{24}T_2$$

By combining the expressions (14) and (18), the following expression (19) is obtained.

$$\begin{bmatrix} u_i \\ T_o \end{bmatrix} = \begin{bmatrix} 0 & 0 \\ b_{21} & b_{22} \end{bmatrix} \begin{bmatrix} T_R \\ T_E \end{bmatrix} + \begin{bmatrix} b_{13} & b_{14} \\ b_{23} & b_{24} \end{bmatrix} \begin{bmatrix} T_1 \\ T_2 \end{bmatrix} \quad (19)$$

By replacing $u_i$, $T_o$, $T_R$, $T_E$, $T_1$ and $T_2$ with $u_i^*$, $T_o^*$, $eT_R$, $dT_E$, $T_{10}^*$ and $T_{20}^*$, respectively, in the expression (19), the following expression (19A) is obtained.

$$\begin{bmatrix} u_i^* \\ T_o^* \end{bmatrix} = \begin{bmatrix} 0 & 0 \\ b_{21} & b_{22} \end{bmatrix} \begin{bmatrix} eT_R \\ dT_E \end{bmatrix} + \begin{bmatrix} b_{13} & b_{14} \\ b_{23} & b_{24} \end{bmatrix} \begin{bmatrix} T_{10}^* \\ T_{20}^* \end{bmatrix} \quad (19A)$$

By modifying this expression (19A), the expression (5) representing the control rule is obtained.

By setting K so as to be sufficiently larger than the maximum value of the absolute value of $(b_{11}T_R + b_{12}T_E)$, the target driving torque is achieved, and therefore it becomes possible to calculate the ideal motor torque by which the engine speed follows the target engine speed.

Figure 9:
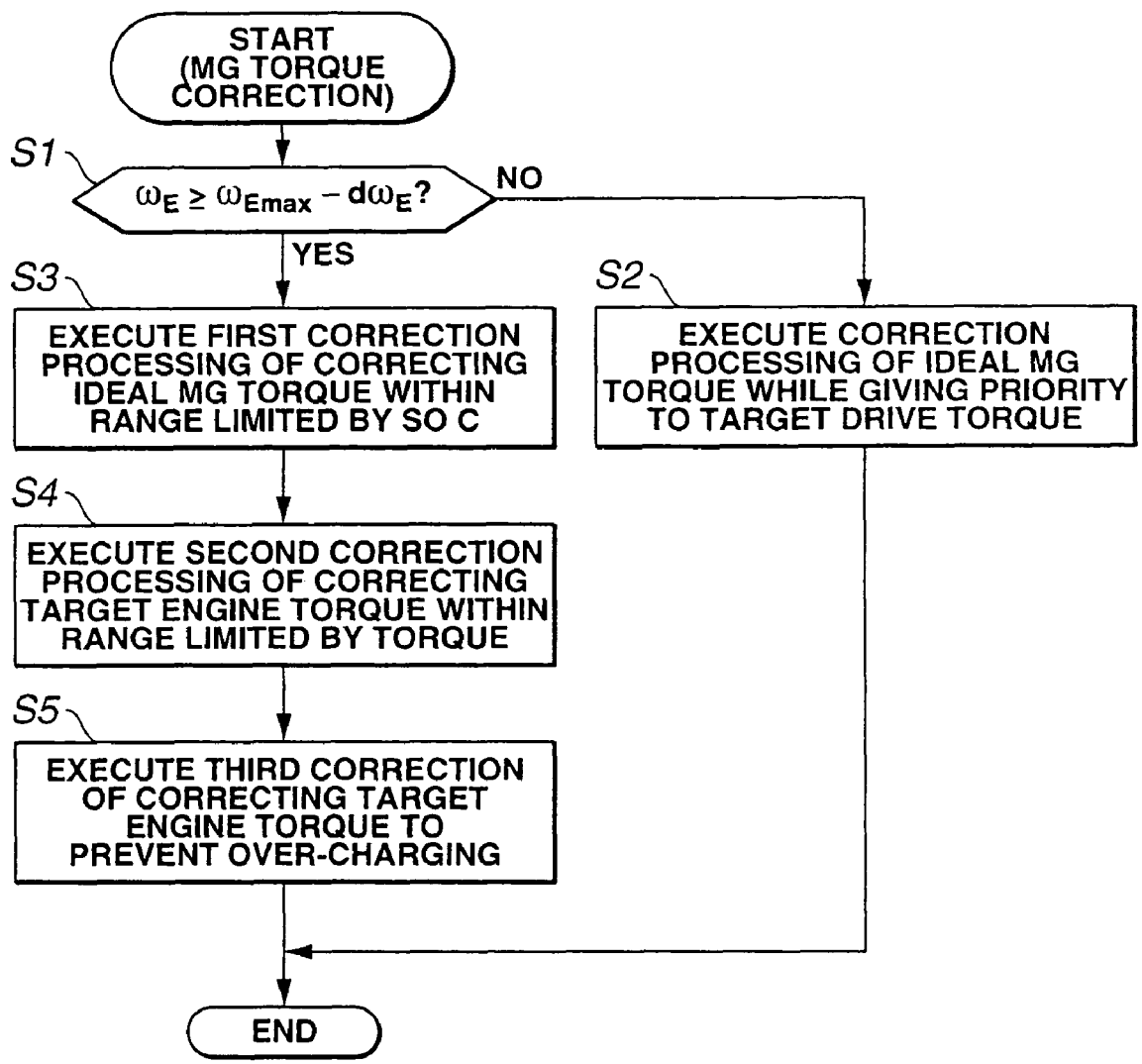
FIG. 9 is a flowchart showing a control program executed by a motor torque correcting section shown in FIG. 6.

When ideal motor/generator torques $T_{10}^*$ and $T_{20}^*$ becomes greater than the motor torque range (achievable range) which can be achieved under the present battery and motor conditions, motor torque correcting section 33 in FIG. 6 limits ideal motor/generator torques $T_{10}^*$ and $T_{20}^*$ within the realizable range and obtains final ideal motor/generator torques $T_1^*$ and $T_2^*$, by executing a control program shown in FIG. 9.

Figure 10:
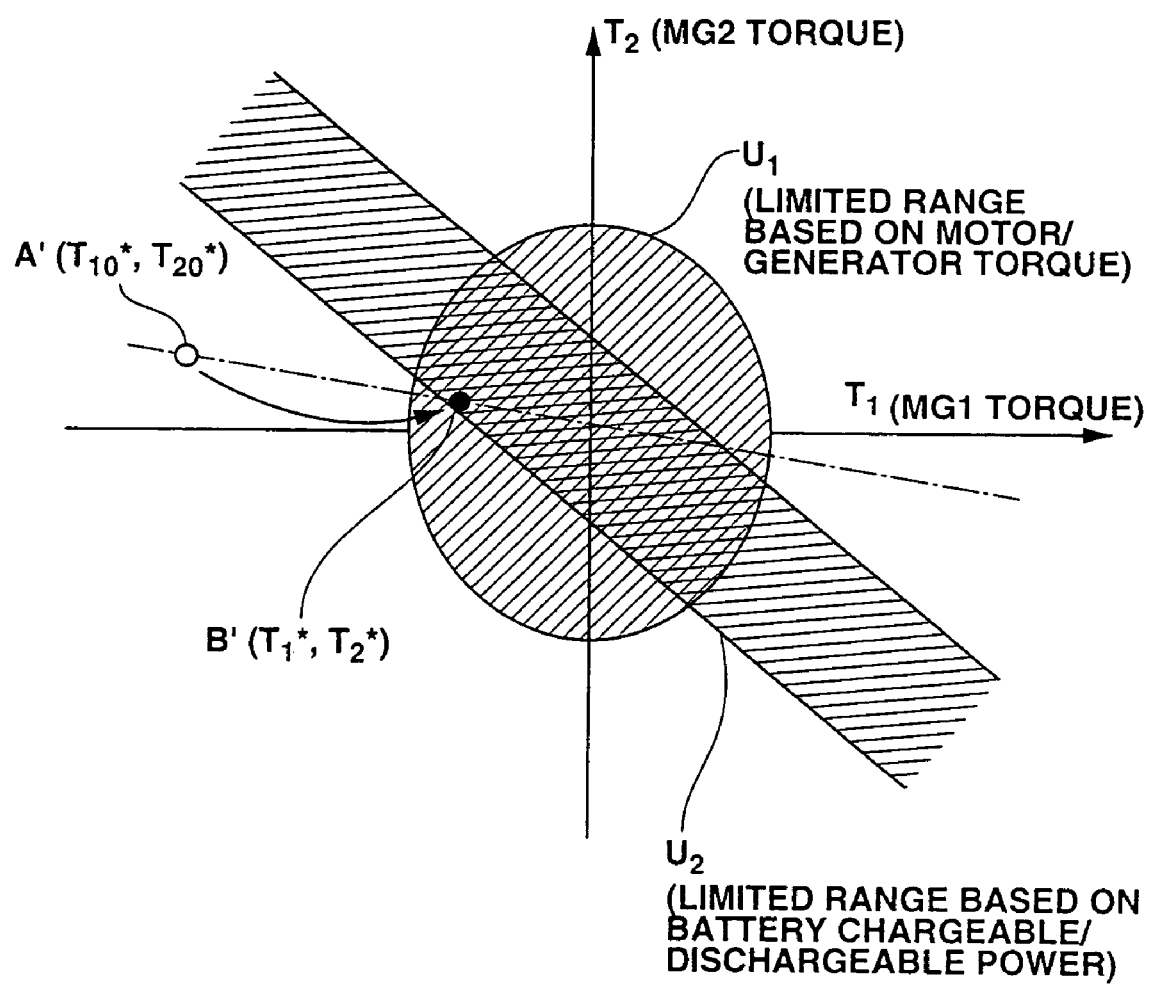
FIG. 10 is an explanatory view of a driving-torque precedence ideal motor/generator torque correcting processing.
Figure 11:
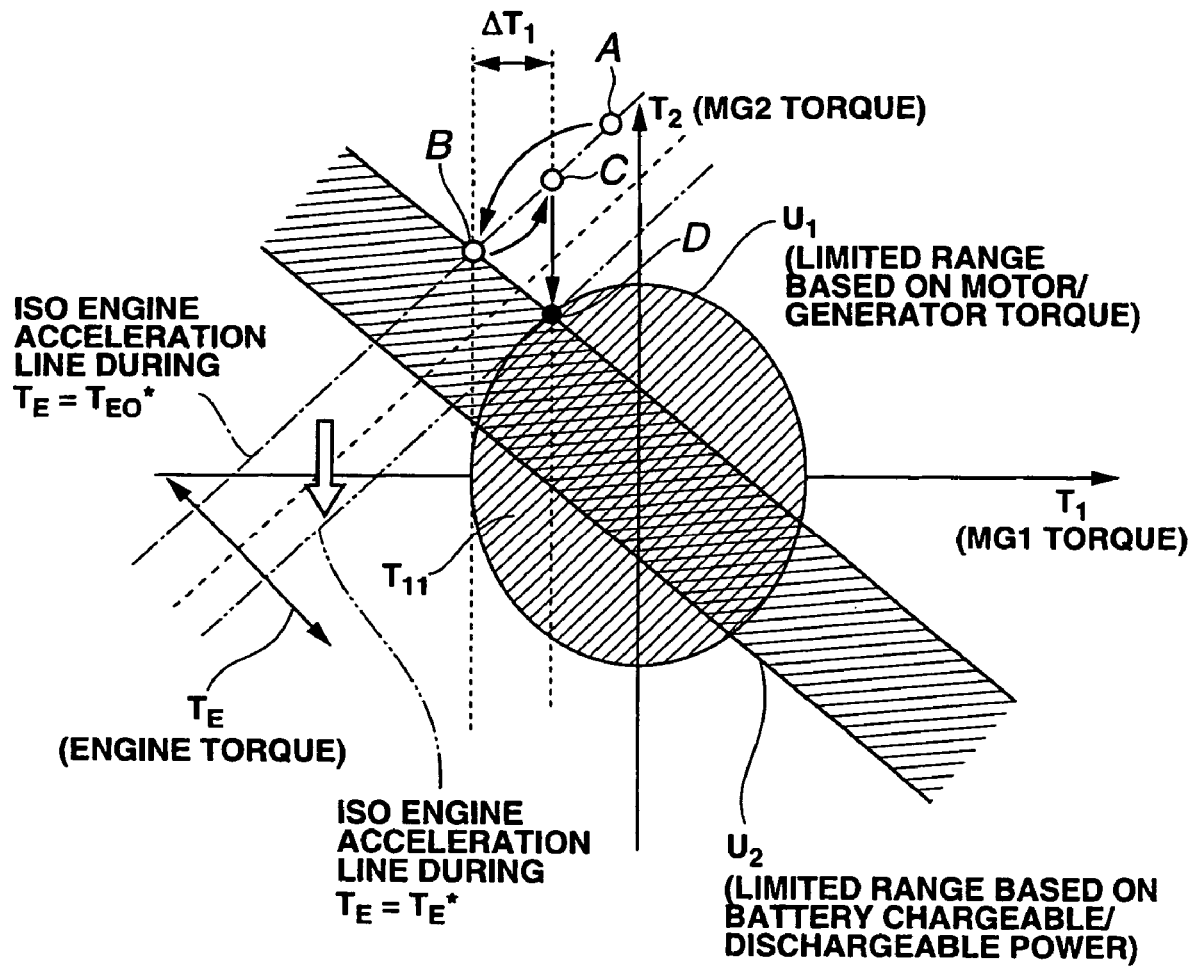
FIG. 11 is an explanatory view of an engine-speed precedence ideal motor/generator torque correction processing.

FIGS. 10 and 11 are graphs showing the achievable range in two-dimensional coordinates where the horizontal axis is first motor/generator torque $T_1$ and the vertical axis is second motor/generator torque $T_2$.

On this two-dimensional coordinate system, there are shown a limited range $u_1$ limited by the motor torque (motor power) which is determined from the revolution speed of first motor/generator MG1 and the revolution speed of second motor/generator MG2, and another limited range $u_2$ determined by the battery chargeable/dischargeable power. The area of the intersection between the limited range $u_1$ and the limited range $u_2$ is a realizable range, and the other area except for the area of the intersection is an unrealizable range.

An important feature of the present invention is a feature of correcting ideal-motor/generator torques $T_{10}^*$ and $T_{20}^*$ so as to be in the realizable range when ideal motor/generator torques $T_{10}^*$ and $T_{20}^*$ is out of the realizable range. By executing this correction according to the inventive feature of the present invention, it becomes impossible to achieve at least one of target driving torque and target engine speed.

Since a driver usually desires the driving torque prior to the engine speed, the ideal motor torque is corrected so as to achieve the target driving torque with a high priority.

However, when engine ENG is operating at the engine speed near the allowable upper limit, there is a possibility that the engine speed becomes greater than the allowable limit by executing the correcting operation. In order to avoid this exceeding-revolution of engine ENG due to this correcting operation, the correcting operation of the ideal motor torque is executed so as to achieve the target engine speed prior to the target driving torque.

Hereinafter, there is discussed the correcting operation of the ideal motor torque which is executed by the implement of the control program in FIG. 9.

The control program of FIG. 9 starts when it becomes necessary to execute the correction of the ideal motor torque. At step S1 in FIG. 9, engine speed $\omega_E$ is compared with a set value $(\omega_{Emax} - d\omega_E)$ which is smaller than the allowable upper limit $\omega_{Emax}$ by a safety margin $d\omega_E$. More specifically, it is determined at step S1 whether or not the engine speed is in a range having a possibility of generating the exceeding-revolution of engine ENG, by determining whether or not the engine speed is greater than or equal to set value $(\omega_{Emax} - d\omega_E)$.

When it is determined at step S1 that $\omega_E < (\omega_{Emax} - d\omega_E)$, that is, when there is no possibility of generating the exceeding-revolution of engine ENG, the program proceeds to step S2 wherein a driving-torque precedence correction processing is executed. By the execution of the driving-torque precedence correction processing, ideal motor/generator torques $T_{10}^*$ and $T_{20}^*$ are corrected to values $T_1^*$ and $T_2^*$ in the realizable range so that the target driving torque $T_o^*$ is achieved prior to target engine speed $\omega_E$.

Hereinafter, there is discussed this correction processing executed at step S2. Firstly, by rewriting the relationship among driving torque $T_o$, running resistance $T_R$, engine torque $T_E$, first motor/generator torque $T_1$, and second motor/generator torque $T_2$ shown in the expression (18), the following expression (20) is obtained.

$$T_2 = -\frac{b_{23}}{b_{24}}T_1 - \frac{b_{21}}{b_{24}}T_R - \frac{b_{22}}{b_{24}}T_E + \frac{1}{b_{24}}T_0 \quad (20)$$

From the expression (20), the relationship between first motor/generator torque T1 and second motor/generator torque T2 under a condition that the running resistance torque, the engine torque and the target driving torque at the present time are determined is represented by a dot-and-dash line in FIG. 10.

When the combination of ideal motor/generator torques $T_{10}^*$ and $T_{20}^*$ is positioned at a point A' on the dot-and-dash line and in the unrealizable range, by correcting ideal motor/generator torques $T_{10}^*$ and $T_{20}^*$ from point A' to a point B' at which the combination of ideal motor/generator torques $T_1^*$ and $T_2^*$ are positioned within the realizable range, it becomes possible to correct the combination of ideal motor/generator torques $T_{10}^*$ and $T_{20}^*$ in the unrealizable range to the combination of ideal motor/generator torques $T_1^*$ and $T_2^*$ within the realizable range while achieving the target driving torque $T_o^*$.

More specifically, such correction processing of correcting ideal motor/generator torques $T_{10}^*$ and $T_{20}^*$ in the unrealizable range to ideal motor/generator torques $T_1^*$ and $T_2^*$ within the realizable range may be executed using a map obtained based on an off-line calculation result.

When it is determined at step S1 that $\omega_E \geq (\omega_{Emax} - d\omega_E)$, that is, when there is a possibility of generating the exceeding-revolution of engine ENG, the program sequentially proceeds to steps S3, S4 and S5. By the execution of steps S3 through S5, an engine-speed precedence correction processing is executed. By executing the engine-speed precedence correction processing, ideal motor/generator torques $T_{10}^*$ and $T_{20}^*$ are corrected so that target engine speed $\omega_E^*$ is achieved prior to target driving torque $T_o^*$.

More specifically, at step S3 a first correction processing is executed so that ideal motor/generator torques $T_{10}^*$ and $T_{20}^*$ are positioned in the limited range U2 limited by the battery chargeable/dischargeable power.

A relationship among battery charging/discharging electric power $P_B$, first motor/generator revolution speed $\omega_1$, first motor/generator torque $T_1$, second motor/generator revolution speed $\omega_2$ and second motor/generator torque $T_2$ is represented by the following expression (21).

$$P_B = \omega_1 T_1 + \omega_2 T_2 \quad (21)$$

Battery charging/discharging electric power $P_{Bd}$ on the assumption that ideal motor/generator torques are outputted, is represented using the expression (21) as follows.

$$P_{Bd} = \omega_1 T_{10}^* + \omega_2 T_{20}^* \quad (22)$$

A quantity $\Delta P_B$ exceeding the battery chargeable/dischargeable electric power is obtained from battery chargeable/dischargeable electric power $P_{Bd}$ as follows.

When $P_{Bd} > P_{Bmax}$, $\Delta P_B = P_{Bd} - P_{Bmax}$.
When $P_{Bmax} > P_{Bd} > P_{Bmin}$, $\Delta P_B = 0$.
When $P_{Bmin} > P_{Bd}$, $\Delta P_B = P_{Bd} - P_{Bmin}$.

Using the expression (21), a relationship between a torque correction quantity $\Delta T_{11}$ of first motor/generator MG1 and a torque correction quantity $\Delta T_{12}$ of second motor/generator MG2, for canceling exceeded quantity $\Delta P_B$ to zero, is represented by the following expression (23).

$$\Delta P_B = \omega_1 \Delta T_{11} + \omega_2 \Delta T_{21} \quad (23)$$

By setting torque correction quantity $\Delta T_{11}$ of first motor/generator MG1 and torque correction quantity $\Delta T_{12}$ of second motor/generator MG2 so as to satisfy the following expression (24) based on the expression (14), the correction quantities of first and second motor/generators MG1 and MG2 are obtained while satisfying the relationship of the expression (14).

$$0 = b_{13}\Delta T_{11} + b_{14}\Delta T_{21} \quad (24)$$

Therefore, by solving the expressions (23) and (24) as simultaneous equations, torque correction quantity $\Delta T_{11}$ of first motor/generator MG1 and torque correction quantity $\Delta T_{12}$ of second motor/generator MG2, which are capable of suppressing the battery charging/discharging power within the battery chargeable/dischargeable power while achieving target engine speed $\omega_E^*$, are obtained.

First-correction first and second motor/generator torque $T_{1m1}$ and $T_{1m2}$ are represented by the following expressions (25) and (26).

$$T_{1m1} = T_{10}^* - \Delta T_{11} \quad (25)$$

$$T_{2m1} = T_{20}^* - \Delta T_{21} \quad (26)$$

At step S4, there is executed a second correction processing for suppressing the first-correction first and second motor/generator torques $T_{1m1}$ and $T_{1m2}$ within the torque limit in case that the first-correction first and second motor/generator torques $T_{1m1}$ and $T_{1m2}$ increase in the direction of increasing a motor operation.

At step S3 battery charging/discharging power, which is the sum of the powers of first and second motor/generators MG1 and MG2, is limited within limited range U1. However, there is a possibility that first-correction ideal motor/generator torques $T_{1m1}$ and $T_{2m1}$ become out of the respective limits.

Therefore, when first-correction first ideal motor/generator torque $T_{1m1}$ is out of the torque limit in the direction of increasing the motor operation, a motor torque correction quantity $\Delta T_{12}$ corresponding to the excessive quantity is calculated.

A motor torque correction quantity $\Delta T_{22}$ of first-correction second ideal motor/generator torque $T_{2m1}$ is obtained using the expression (24).

Since the obtained motor torque correction quantities $\Delta T_{12}$ and $\Delta T_{22}$ satisfy the relationship of the expression (24), target engine speed $\omega_E^*$ is achieved even if the motor torque is corrected.

The second-correction ideal motor/generator torques $T_{1m2}$ and $T_{2m2}$ are obtained from the following expressions (27) and (28).

$$T_{1m2} = T_{m1} - \Delta T_{12} \quad (27)$$

$$T_{2m2} = T_{m2} - \Delta T_{22} \quad (28)$$

Subsequently, when first-correction second ideal motor/generator torque $T_{2m1}$ is out of the torque limit in the motor operating (acceleration) direction, toque correction quantity $\Delta T_{23}$ corresponding to the excessive quantity is calculated.

A motor torque correction quantity $\Delta T_{13}$ of a third-correction first ideal motor/generator torque $T_{1m3}$ is obtained.

Since the obtained motor torque correction quantities $\Delta T_{13}$ and $\Delta T_{23}$ also satisfy the relationship of the expression (24), target engine speed $\omega_E^*$ is achieved even if first-correction ideal motor/generator torques $T_{1m1}$ and $T_{2m1}$ are corrected.

Third-correction first and second ideal motor/generator torques $T_{1m3}$ and $T_{2m3}$ are obtained from the following expressions (29) and (30).

$$T_{1m3}=T_{m2}-\Delta T_{13} \quad (29)$$

$$T_{2m3}=T_{m3}-\Delta T_{23} \quad (30)$$

At step S5, a third correction processing of correcting target engine torque $T_{EO}^*$ downward is executed so as to decrease the engine power according to the exceeding-charging electric power when the corrected battery charging/discharging electric power at step S3 again becomes greater than the allowable charged limit due to the decrease of the motor power of working as a motor at step S4.

The battery charging/discharging electric power, on the assumption that third-correction first ideal motor/generator torque $T_{1m3}$ obtained at step S5 and third-correction second ideal motor/generator torque $T_{2m3}$ obtained at step S5 are outputted, is represented using the expression (20) as follows.

$$P_{Bd}=\omega_1 T_{1m3}+\omega_2 T_{2m3} \quad (31)$$

The battery exceeding-charging electric power $P_{Bc}$ is obtained from the following expression (32).

$$P_{Bc}=P_{Bd}-P_{Bmin} \quad (32)$$

In order to achieve target engine speed $\omega_E^*$, a power corresponding to the battery exceeding-charging electric power is excessive. Therefore, target engine torque $T_{EO}^*$ is corrected downward by the power corresponding to the battery exceeding-charging electric power.

The downward correction quantity $\Delta T_E$ of target torque $T_{EO}^*$ is obtained from the following expression (33)

$$\Delta T_E = \frac{P_{Bc}}{\omega_E} \quad (33)$$

Since the downward correction quantity $\Delta T_E$ of target torque $T_{EO}^*$ is an excessive torque of the present engine torque for obtaining the desired engine speed, the corrected target engine torque is represented by the following expression (33A).

$$T_E^*=dT_E-\Delta T_E \quad (33A)$$

There is discussed the correction procedures of the first through third correction processings for ideal motor/generator torques $T_{10}^*$ and $T_{20}^*$, with reference to FIG. 11.

When a point indicative of a combination of ideal motor/generator torques $T_{10}^*$ and $T_{20}^*$ is positioned at the point A outside the realizable range in the second-dimensional coordinate system shown in FIG. 11, ideal motor/generator toques $T_{10}^*$ and $T_{20}^*$ are corrected so as to be located within the realizable range.

From the equation of motion represented by the expression (7), engine rotational acceleration $a\omega_E$ on the assumption that ideal motor/generator torques $T_{10}^*$ and $T_{20}^*$ are outputted under a condition of the running resistance torque $T_R$ and engine torque $T_E$ at the present time, is obtained as follows.

$$a\omega_E=b_{11}T_R+b_{12}T_E+b_{13}T_{10}^*+b_{14}T_{20}^* \quad (34)$$

From the expression (34), an equation of a straight line including the point A indicative of the combination of ideal motor/generator torques $T_{10}^*$ and $T_{20}^*$ is represented by the following expression (35).

$$T_2 = -\frac{b_{13}}{b_{14}}T_1 - \frac{b_{11}}{b_{14}}T_R - \frac{b_{12}}{b_{14}}T_E + \frac{a\omega_E}{b_{14}} \quad (35)$$

This straight line is shown by a dot-and-dash line on the two-dimensional coordinate system in FIG. 11. Even if motor/generator torques are varied on this straight line, engine rotational acceleration $a\omega_E$ is kept constant.

The first correction processing executed at step S3 corrects ideal motor/generator torques $T_{10}^*$ and $T_{20}^*$ as shown by the expressions (25) and (26).

From the expressions (34), (25) and (26), the following expression (36) is obtained.

$$a\omega_E=b_{11}T_R+b_{12}T_E+b_{13}(T_{1m1}+\Delta T_1)+b_{14}(T_{2m1}+\Delta T_2) \quad (36)$$

From the expressions (24) and (36), the following expression (37) is obtained.

$$a\omega_E=b_{11}T_R+b_{12}T_E+b_{13}T_{1m1}+b_{14}T_{2m1} \quad (37)$$

From the expression (37), it is found that first-correction ideal motor/generator torques $T_{1m1}$ and $T_{2m1}$ satisfy the relationship of the expression (35). Therefore, it is possible to correct the motor/generator torques without changing engine rotational acceleration $a\omega_E$.

By the execution of the first correction processing, the point A is corrected to a point B (combination of motor/generator torques) located in the battery chargeable/dischargeable range.

By the execution of the second correction processing, the motor/generator torques, which increases over the limit (the power increased direction), is suppressed in the torque limit.

As discussed above, the first correction processing suppressed the motor/generator torques within the range limited by the battery chargeable/dischargeable electric power.

As shown by the expression (21), the battery charging/discharging electric power is the sum of the electric powers of first and second motor/generators MG1 and MG2.

Accordingly, the discharging quantity of battery 25 is decreased by correcting the torque of the motor/generator acting as a motor within the limited range. Therefore, the battery charging/discharging electric power does not become over the battery chargeable/dischargeable electric power range toward the discharging side.

FIG. 11 shows a correction example in case that first motor/generator MG1 is operating as a motor, and therefore the first motor/generator torque is decreased by an excess quantity $\Delta T_1$. The second motor/generator torque is corrected by a quantity corresponding to the excess quantity $\Delta T_1$ using the expression (24).

Therefore, the combination point of the first and second motor/generator torques is corrected from the point B to the point C by means of the second correction processing.

By the execution of the third correction processing, a power balance is justified by decreasing the power corresponding to an exceeding-charging electric power or an exceeding-regenerative electric power from the engine power in case that the battery charging/discharging electric power again becomes greater the charging side limit by the execution of the second correction processing or when the regenerative electric power of the motor becomes greater than the rated regenerative electric power.

By correcting the engine torque so as to decrease the engine power by a quantity corresponding to the exceeding-charging electric power, the straight line representing the relationship between the engine rotational acceleration $a\omega_E$ and the motor torque in FIG. 11 is charged from a dot and dash line to a two-dot and dash line.

Therefore, when the engine torque is decreased to this desired quantity, it becomes possible to correct the motor torque at the point D within the realizable range only by the execution of the first correction processing and the second correction processing.

However, during a period until the engine torque is decreased to this desired value, the straight line representing the relationship between the engine rotational acceleration $a\omega_E$ and the motor torque in FIG. 11 is positioned between the dot-and-dash line to the two-dot and dash line.

Therefore, if the first correction processing and the second correction processing are only executed, the combination of the corrected motor/generator torques corrected by the second correction processing is positioned at a point between the point C and the point D and out of the realizable range.

The excess quantity over the realizable range is a regenerative electric power over the rated regenerative quantity of the motor or an exceeding-charging electric power. Therefore, by executing the third correction processing, a regenerative torque corresponding to a larger one of the exceeding-regenerative torque and the battery exceeding-charging electric power is decreased from the motor/generator generating a regenerative electric power.

By this execution of the fourth correction processing, the combination of the motor/generator torques is corrected to the point D. However, if the combination of the motor/generator torques, which performs engine rotational acceleration $a\omega_E$, is represented by a broken line in FIG. 11, the corrected point D is not positioned on the broken line and therefore, the corrected combination of the motor/generator torques cannot achieve engine rotational acceleration $a\omega_E$.

However, such a condition that there is no combination of the motor/generator torque of achieving the engine rotational acceleration $a\omega_E$ on the straight broken line, is generated during a moment until the engine torque is lowered to the target engine torque.

Accordingly, during this moment, the engine speed does not largely deviate from the target engine speed. Further the target engine torque is achieved after the engine torque once reached the target engine torque, and therefore the engine does not degraded by exceeding-revolution.

Further, the margin $d\omega_E$ may be set at a larger value in order to prevent the exceeding-revolution due to the momentary difference during the correction processing.

With the thus arranged shift control system according to the first embodiment of the present invention, both ideal motor/generator torques are corrected to the value within the realizable range. This prevents both of first and second motor/generators MG1 and MG2 from receiving the unrealizable ideal torque command, and therefore the stability of the shift control is improved.

Further, when the ideal motor/generator torques are corrected and when the actual engine speed is greater than the allowable upper limit revolution speed, the engine-speed precedence correction is executed so as to achieve the target engine speed prior to the target driving torque. This enables both ideal motor/generator torques to be corrected within the realizable range while avoiding the exceeding-revolution of engine ENG.

On the other hand, when the ideal motor/generator torques are corrected and when the actual engine speed does not become greater than the allowable upper limit engine speed, the driving-torque precedent correction processing is executed so as to achieve the target driving torque prior to the target engine speed. Therefore, both of ideal motor/generator torques are corrected so as to be located within the realizable range while avoiding the unnatural change of the driving torque and therefore preventing the unsuitable acceleration/deceleration.

With the thus arranged embodiment according to the present invention, ideal torques of first and second motor/generators MG1 and MG2 are corrected so that first and second motor/generators MG1 and MG2 operate within the realizable range. This correction is executed so as not to generate the exceeding-revolution of engine ENG and the unnatural change of the driving torque. Therefore, it becomes possible to solve the problem relating the durability of engine ENG and the problem relating the generation of the uncomfortable acceleration/deceleration of the vehicle.

Further, with the thus arranged shift control system according to the first embodiment of the present invention, the engine-speed precedence correction processing including the first and second correction processings is executed and therefore the following advantages are obtained.

The first correction processing is arranged such that the exceeding charging/discharging electric power over the battery chargeable/dischargeable electric power is calculated on the assumption that both motor/generators MG1 and MG2 output ideal motor/generator torques $T_{10}^*$ and $T_{20}^*$, respectively, and that ideal motor/generator torques $T_{10}^*$ and $T_{20}^*$ are corrected so as to control the exceeding charging/discharging electric power to zero while achieving the target engine speed $\omega_E$.

The second correction processing is arranged such that when ideal motor/generator torques corrected by the first correction processing are outputted and when the sum of the motor operation torques of first and second motor/generators MG1 and MG2 is over the limit, ideal motor/generator torques are further corrected so as to locate the motor operation torques of motor/generators MG1 and MG2 within the limit values while achieving the target engine speed $\omega_E$.

The third correction processing is arranged such the exceeding-charging electric power and the exceeding regenerative electric power over the rated power of the motor/generators are calculated on the assumption that both motor/generators MG1 and MG2 output ideal motor/generator torques corrected by the second correction processing and that the target engine torque is corrected so as to decrease (downwardly correct) the engine power by a quantity corresponding to the larger one of the exceeding-charging electric power over the battery chargeable/dischargeable electric power and the exceeding regenerative electric power over the rated power of the motor/generators.

With the first embodiment according to the present invention, since the engine speed precedence correction processing includes the first and second correction processings, it is possible to correct the ideal motor/generator torque by means of algebraic calculation. This achieves the target engine speed and prevents the exceeding revolution of engine ENG without requesting the increase of a computer memory capacity due to the calculation using a map.

Since the third correction processing is arranged such that the third correction processing is executed such the exceeding regenerative electric power over the rated power of the motor/generators is calculated on the assumption that both motor/generators MG1 and MG2 output ideal motor/generator torques corrected by the second correction processing and that the target engine torque is corrected so as to decrease (downwardly correct) the engine power by a quantity corresponding to the exceeding regenerative electric power over the rated power of the motor/generators.

Accordingly the exceeding-charging of the battery and the exceeding-regeneration of the motor are prevented in case that the actual engine torque delays relative to the target engine torque set in the third correction processing and cannot follows the decrease of the engine power.

FIGS. 12A through 12F show a simulation result of the control of the hybrid transmission in case that the transmission mode of the hybrid transmission is changed from the fixed transmission ratio mode to the continuously variable transmission ratio mode at a time $t_m$ and the above discussed correction processing was executed in the continuously variable transmission ratio mode after the time $t_m$.

Figure 12:
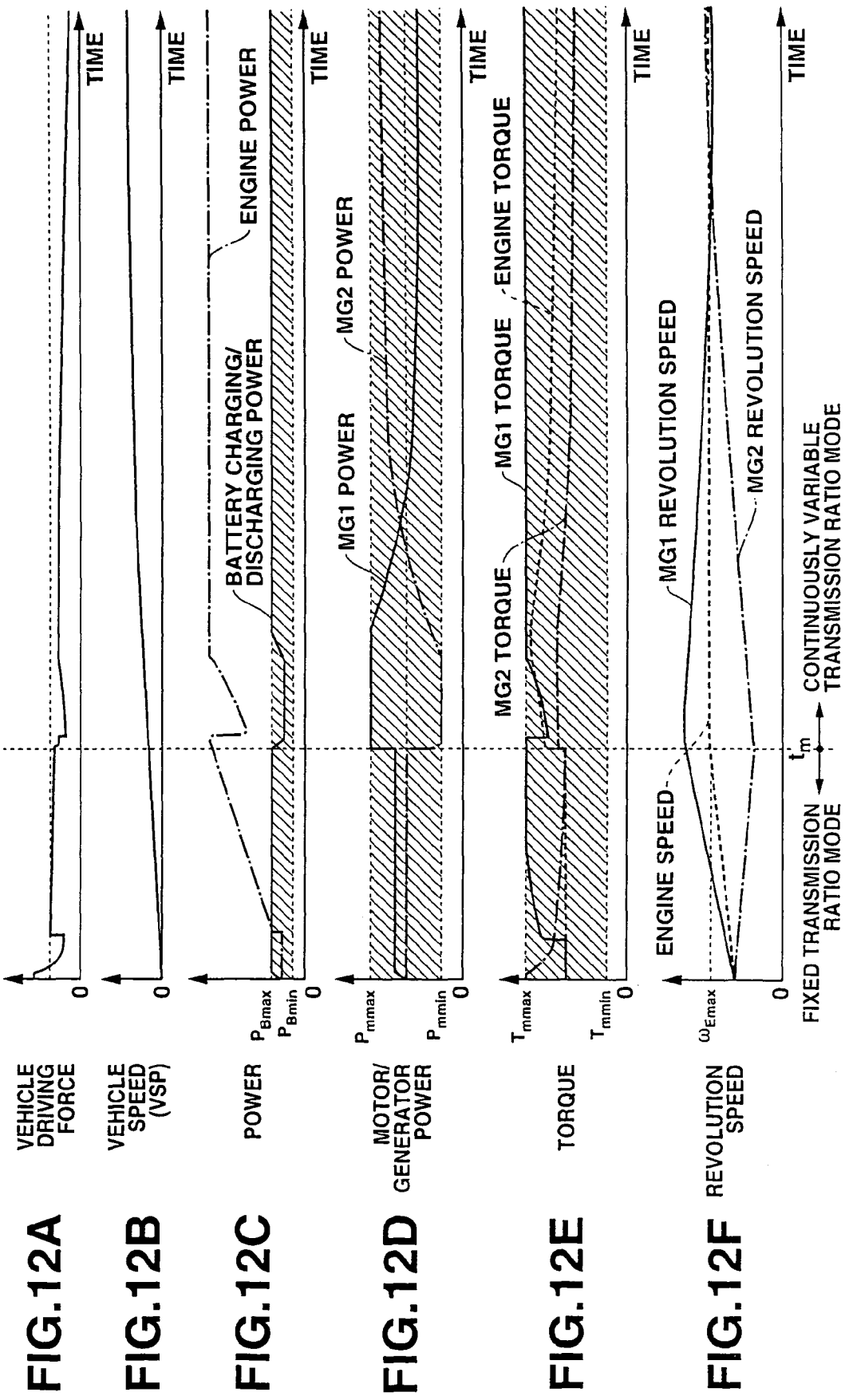
FIGS. 12A through 12F are operation time charts showing the shift control executed by the shift control system of the first embodiment under the continuously variable transmission ratio mode.

FIG. 12A shows a time-series change of a vehicle driving force. FIG. 12B shows a time-series change of vehicle speed VSP. FIG. 12C shows a time-series change of power wherein a continuous line denotes the battery charging/discharging electric power, a dot-and-dash line denotes the engine power, $P_{Bmax}$ denotes a battery charging/discharging electric power maximum value, and $P_{Bmin}$ denotes a battery charging/discharging electric power minimum value. FIG. 12D denotes a time-series change of the motor/generator power wherein a continuous line denotes the power of first motor/generator MG1, a dot-and-dash line denotes the power of second motor/generator MG2, $P_{mmax}$ denotes the motor/generator power maximum value, and $P_{mmin}$ denotes the motor/generator power minimum value. FIG. 12E denotes the time-series change of the motor/generator torque wherein a continuous line denotes the torque of first motor/generator MG1, a dot and dash line denotes the torque of second motor/generator MG2, $T_{mmax}$ denotes the motor/generator torque maximum value, and $T_{mmin}$ denotes the motor/generator torque minimum value. FIG. 12F denotes the time-series change of the revolution speed wherein a continuous line denotes the revolution speed of first motor/generator MG1, a dot and dash line denotes the revolution speed of second motor/generator MG2, $\omega_{Emax}$ denotes the motor/generator revolution speed maximum value, and $\omega_{Emin}$ denotes the motor/generator revolution speed minimum value.

As is apparent from FIGS. 12A through 12F, during the continuously variable transmission ratio mode after the time tm, engine speed is kept at the allowable upper limit speed $\omega_{Emax}$ and thereby preventing the engine speed from reaching the exceeding speed greater than the allowable upper limit engine speed $\omega_{Emax}$.

Further, all of the motor/generator torque, the motor/generator power and the battery charging/discharging electric power are kept within the limited ranges shown by hatchings.

As discussed above, if the desired engine speed is achieve, the engine power becomes too great so as to generate the exceeding-charging electric power and the exceeding-regenerative electric power. Therefore, in order to prevent the generation of the exceeding-charging electric power and the exceeding regenerative electric power, the third correction processing is executed. As a method of decreasing the electric power, the excessive power may be decreased as a heat generated by sliding high clutch Chi in the Low-iVT mode, in addition to the decrease of the engine torque.

If such a heat discharging method is employed, the control procedure of high clutch Chi is explained as follows. A transmission torque of high clutch Chi is represented by the following expression (38).

$$T_B = k_B \mu_B F_B \quad (38)$$

where $k_B$ is a constant determined by a specification of a clutch, $\mu_B$ is a pressing force of a clutch plate, and $F_B$ is a friction coefficient of the clutch plate.

A heat value $P_{brake}$ per unit time during the slippage of high clutch Chi is represented by the following expression (39).

$$P_{brake} = T_B \omega_B \quad (39)$$

where $\omega_B$ is a difference of a revolution speed difference of a plate of high clutch Chi.

Therefore, the target engine torque corrected using high clutch Chi is represented by the following expressions (40) and (41).

$$T_E^* = dT_E - \Delta T_E' \quad (40)$$

$$\Delta T_E' = \frac{P_{Bc} - P_{brake}}{\omega_E} \quad (41)$$

The accumulated heat value of high clutch Chi during a period from a clutch slip time t1 to a present time t is represented by the following expression (42).

$$U_B = \int_{t1}^{t} (P_{brake} - P_c) dt \quad (42)$$

where $P_c$ is a heat value per unit time which is lost by the cooling of high clutch Chi.

An assist quantity of high clutch Chi is determined according to the obtained value $U_B$ or $P_{brake}$, taking account of the durability of high clutch Chi.

Since the excessive power is consumed in the form of heat at high clutch Chi instead of decreasing the engine torque by sliding high clutch Chi, the lowering of the driving force due to the decrease of the engine torque is preferably suppressed.

The shift control system according to the present invention is not limited to the application to the above-discussed structure of the hybrid transmission, and may be applied to other hybrid transmission as far as it is arranged to execute the shift control by controlling both motor/generators in the arrangement of a differential mechanism among an engine, an output shaft and the two motor/generators.

Figure 13:
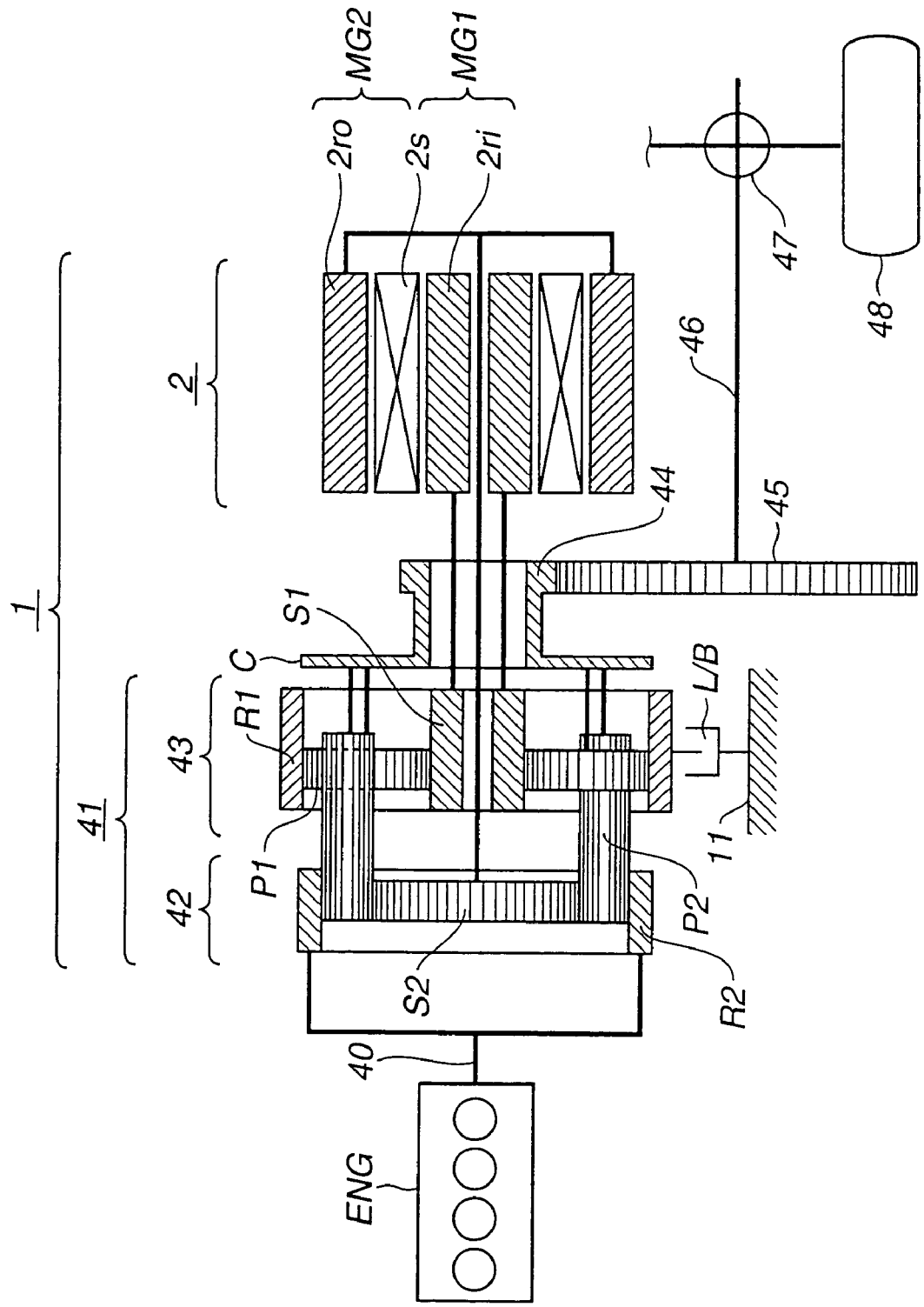
FIG. 13 is a view showing another hybrid transmission to which the shift control system according to the present invention is applicable.

FIG. 13 shows another structure of a hybrid transmission to which the shift control system according to the present invention is applicable.

The hybrid transmission 1 shown in FIG. 13 is preferably applicable to a front wheel drive vehicle. In FIG. 13, the elements as same as those in FIG. 2 are denoted by the same reference numerals shown in FIG. 2.

The hybrid transmission 1 is constructed by coaxially arranging a Ravigneaux planetary gearset 41 functioning as a differential device and a complex-current two-layer motor 2.

Ravigneaux planetary gearset 41 is constructed by single pinion planetary gearsets 42 and 43. Single pinion planetary gearset 42 has a structure of meshing pinions P2 to a sun gear S2 and a ring gear R2. Similarly, single pinion planetary gearset 43 has a structure of meshing pinions P1 to a sun gear S1 and a ring gear R1.

Pinions P1 and P2 are rotatably supported by a common carrier C, and pinions P2 are long pinions and are meshed with pinions P1, respectively. Accordingly, two single pinion planetary gearsets 42 and 43 are relationally connected and construct Ravigneaux planetary gearset 41.

Ravigneaux planetary gearset 41 is constructed by five rotational elements including sun gear S1, sun gear S2, ring gear R1, ring gear R1 and carrier 5. Ravigneaux planetary gearset 41 functions as a differential mechanism where when the revolution speeds of two rotational elements are determined, the revolution speeds of the other rotational elements are determined. Such a differential mechanism is connected to other devices such that the revolution of engine ENG coaxially with Ravigneaux planetary gearset 41 and located at a left hand side in FIG. 13 is inputted to ring gear R2 of single planetary gearset 42, an input shaft 40 is connected to ring gear R2 (as an input In of a lever diagram shown in FIG. 14), and a crankshaft of engine ENG is connected to input shaft 43.

An output gear 44 is integrally formed with carrier C so that the output revolution of Ravigneaux planetary gearset 41 is outputted through carrier C. A counter gear 45 is meshed with output gear 44, and counter gear 45 is integrally connected to counter shaft 46. Counter shaft 46 is drivingly connected to right and left wheels 48 through a differential gear device 47. That is, a wheel driveline of the vehicle is constructed by output gear 44, counter gear 45, counter shaft 46 and differential gear device 47, and is represented by an output Out in a lever diagram of FIG. 14.

Compound-current two-layer motor 2 comprises an inner rotor 2 *in*, an annular outer rotor 2*ro* surrounding inner rotor 2 *in*, and an annular stator 2*s* disposed at an annular space between inner and outer rotors 2*ri* and 2*ro*, as is similar to that in FIG. 2. Inner and outer rotors 2*ri* and 2*ro* and annular stator 2*s* are coaxially arranged.

Annular stator 2*s* and outer rotor 2*ro* constructs a first motor/generator (outside motor/generator) MG1, and annular stator 2*s* and inner rotor 2*ri* constructs a second motor/generator (inside motor/generator) MG2.

Compound-current two-layer motor 2 and Ravigneaux planetary gearset 41 are connected in such a manner that first motor/generator MG1 (inner rotor 2*ri*) is connected to sun gear S1 of single pinion planetary gearset 43, second motor/generator MG2 (outer rotor 2*ro*) is connected to sun gear S2 of single pinion planetary gearset 42.

Figure 14:
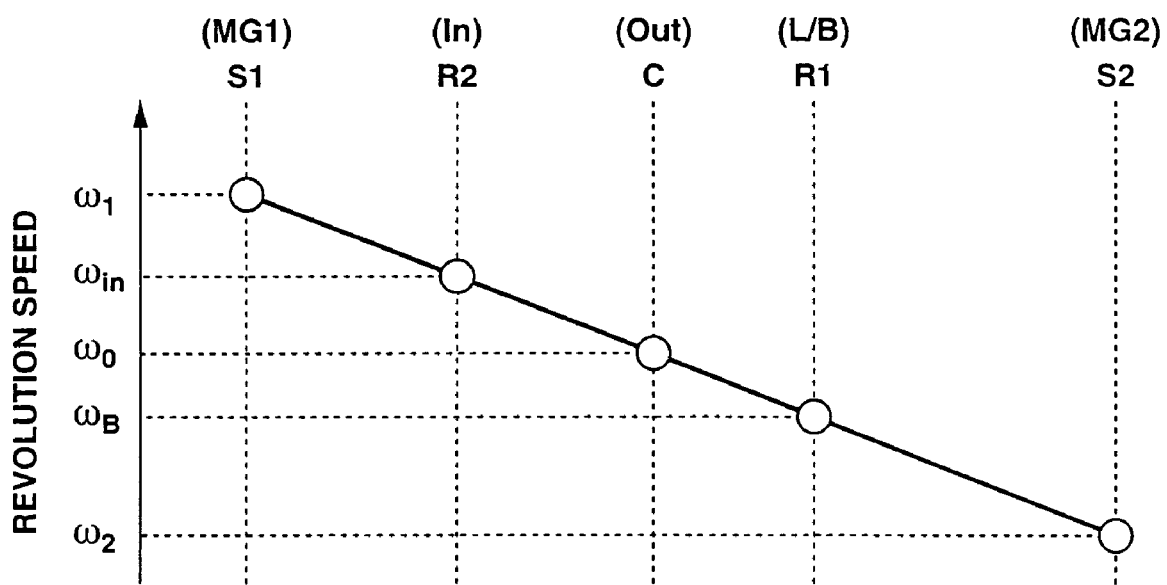
FIG. 14 is a lever diagram of the hybrid transmission shown in FIG. 13.

Such arranged hybrid transmission 1 is represented by a lever diagram shown in FIG. 14.

In this embodiment, the hybrid transmission 1 further comprises a low brake L/B which is capable of fixing ring gear R1 of single pinion planetary gearset 43 to a transmission case 11. When low brake L/B is put in an engaged state, a degree of freedom as to the rotational inertia system of Ravigneaux planetary gearset 41 is set at 1, and therefore hybrid transmission 1 operates in a fixed transmission ratio mode. When low brake L/B is put in a disengaged state, a degree of freedom as to the rotational inertia system of Ravigneaux planetary gearset 41 is set at 2, and therefore hybrid transmission 1 operates in a continuously variable transmission ratio mode.

In case that the thus arranged hybrid transmission 1 according to the second embodiment of the present invention executes a shifting in the continuously variable transmission ratio mode, the shift control according to the present invention is used. By the execution of this shift control, the transmission of the second embodiment also gains the advantages gained by the first embodiment according to the present invention.

This application is based on Japanese Patent Application No. 2003-382679 filed on Nov. 12, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A hybrid drive system comprising:
an internal combustion engine;
an output shaft connected to a wheel driveline of a vehicle;
two motor/generators receiving electric power from a battery;
a differential mechanism relationally connecting the engine, the output shaft and the motor/generators;
an accelerator opening detector detecting an accelerator opening;
a vehicle speed detector detecting a vehicle speed; and
a controller to control the motor/generators in accordance with command motor/generator torques, the controller being connected to the engine, the motor/generators, the accelerator opening detector and the vehicle speed detector, the controller being configured:
to determine a target driving torque, a target engine speed and a target engine torque according to the accelerator opening and the vehicle speed,
to obtain an actual engine torque,
to obtain ideal motor/generator torques for achieving the target driving torque and the target engine speed, from the target driving torque, the target engine speed and an actual engine speed,
to determine the command motor/generator torques by correcting the ideal motor/generator torques within a motor torque range limited by a state-of-charge condition of the battery when the ideal motor/generator torques become out of the motor torque range,
to correct the ideal motor/generator torques so as to achieve the target driving torque prior to the target engine speed when the actual engine speed does not exceed an upper limit of the actual engine speed, and
to correct the ideal motor/generator torques so as to achieve the target engine speed prior to the target driving torque when the actual engine speed exceeds the upper limit.

2. A hybrid drive system for driving a vehicle, comprising:
an internal combustion engine;
a hybrid transmission including first and second motor/generators receiving electric power from a battery;
an accelerator opening detector detecting an accelerator opening;
a vehicle speed detector detecting a vehicle speed; and
a controller to control the first and second motor/generators in accordance with first and second command motor/generator torques, the controller being configured to:
determine a target driving torque, a target engine speed and a target engine torque in accordance with the accelerator opening and the vehicle speed, calculate first and second ideal motor/generator torques for achieving the target driving torque and the target engine speed, from the target driving torque, and the target engine speed,
examine whether the first and second ideal motor/generator torques are outside a predetermined range determined by a state of charge of the battery,
compare an actual engine speed of the engine with a preset speed,
determine the first and second command motor/generator torques such that the first and second command motor/generator torques are inside the predetermined range, by correcting the first and second ideal motor/generator torques in a driving torque precedence mode to achieve the target driving torque prior to the target engine speed when the first and second ideal motor/generator torques are outside the predetermined range, and the actual engine speed is lower than the preset speed, and determine the first and second command motor/generator torques such that the first and second command motor/generator torques are inside the predetermined range, by correcting the first and second ideal motor/generator torques in an engine speed precedence mode to achieve the target engine speed prior to the target driving torque when the first and second ideal motor/generator torques are outside the predetermined range, and the actual engine speed is higher than or equal to the preset speed.

3. A shift control system of a hybrid transmission for a vehicle, the hybrid transmission being constructed by connecting an internal combustion engine, an output shaft, and two motor/generators through a differential mechanism, the shift control system comprising:

controlling means for controlling the hybrid transmission in response to command motor/generator torques;

target value setting means for setting a target driving torque, a target engine speed and a target engine torque according to a vehicle driving condition including an accelerator opening and a vehicle speed;

engine torque detecting means for obtaining an actual engine torque;

ideal motor torque calculating means for calculating ideal motor/generator torques of the motor/generators so as to achieve the target driving torque and the target engine speed, from the target driving torque, the target engine speed, the actual engine torque, and an actual engine speed on a basis of an equation of motion of the output shaft; and motor torque correcting means for determining the command motor/generator torques by correcting the ideal motor/generator torques within a realizable range indicative of a range which can be achieved by the motor/generators and a battery connected to the motor/generators, when the ideal motor/generator torques are out of the realizable range;

the motor torque correcting means correcting the ideal motor/generator torques in an engine speed precedence correcting mode so as to achieve the target engine speed prior to the target driving torque when the actual engine speed becomes greater than a preset engine speed value;

the motor torque correcting means correcting the ideal motor/generator torques in a driving torque precedence correcting mode so as to achieve the target driving torque prior to the target engine speed when the actual engine speed does not become greater than the preset engine speed value;

wherein the motor torque correcting means is configured to perform first, second and third correction operations in the engine speed precedence correcting mode, wherein, in the first correction operation, the motor torque correcting means calculates a difference between a chargeable/dischargeable electric power of the battery connected to the motor/generators, and a charging/discharging electric power of the motor/generators calculated from the ideal motor/generator torques, and calculates first-correction motor/generator torques by correcting the ideal motor/generator torques so as to reduce the difference and to achieve the target engine speed, wherein, in the second correction operation, the motor torque correcting means calculates second-correction motor/generator torques by correcting the first-correction motor/generator torques so as to control actual motor/generator torques within limit values and to achieve the target engine speed, and wherein, in the third correction operation, the motor torque correcting means decreases the target engine torque so as to decrease output power of the engine by an amount corresponding to a larger one of an excessive battery charging electric power and an excessive regenerative electric power, wherein the excessive battery charging electric power is an excess of a battery charging electric power of the motor/generators over the chargeable/dischargeable electric power of the battery, calculated from the second-correction motor/generator torques, and wherein the excessive regenerative electric power is an excess of a regenerative power of the motor/generators over a rated power of the motor/generators, calculated from the second-correction motor/generator torques.

4. A shift control system of a hybrid transmission for a vehicle, the hybrid transmission being constructed by connecting an internal combustion engine, an output shaft, and two motor/generators through a differential mechanism, the shift control system comprising:

a controlling section controlling the hybrid transmission in response to command motor/generator torques;

a target value setting section setting a target driving torque, a target engine speed and a target engine torque according to a vehicle driving condition including an accelerator opening and a vehicle speed;

an engine torque detecting section obtaining an actual engine torque;

an ideal motor torque calculating section calculating ideal motor/generator torques of the motor/generators so as to achieve the target driving torque and the target engine speed, from the target driving torque, the target engine speed, the actual engine torque and an actual engine speed on a basis of an equation of motion of the output shaft; and a motor torque correcting section determining the command motor/generator torques by correcting the ideal motor/generator torques so that the command motor/generator torques are within a realizable range which can be achieved by the motor/generators, when the ideal motor/generator torques are out of the realizable range;

the motor torque correcting section correcting the ideal motor/generator torques in an engine speed precedence correcting mode to achieve the target engine speed prior to the target driving torque when the actual engine speed becomes greater than a preset engine speed value; and the motor torque correcting section correcting the ideal motor/generator torque in a driving torque precedence correcting mode to achieve the target driving torque prior to the target engine speed when the actual engine speed does not become greater than the preset engine speed value;

wherein the motor torque correcting section is configured to perform first, second and third correction operations in the engine speed precedence correcting mode, wherein, in the first correction operation, the motor torque correcting section calculates a difference between a chargeable/dischargeable electric power of a battery connected to the motor/generators, and a charging/discharging electric power of the motor/generators calculated from the ideal motor/generator torques, and calculates first-correction motor/generator torques by correcting the ideal motor/generator torques so as to reduce the difference and to achieve the target engine speed, wherein, in the second correction operation, the motor torque correcting section calculates second-correction motor/generator torques by correcting the first-correction motor/generator torques so as to control actual motor/generator torques within limit values and to achieve the target engine speed, wherein, in the third correction operation, the motor torque correcting section decreases the target engine torque so as to decrease output power of the engine by an amount corresponding to a larger one of an excessive battery charging electric power and an excessive regenerative electric power, wherein the excessive battery charging electric power is an excess of a battery charging electric power of the motor/generators over the chargeable/dischargeable electric power of the battery calculated from the second-correction motor/generator torques, and wherein the excessive regenerative electric power is an excess of a regenerative power of the motor/generators over a rated power of the motor/generators calculated from the second-correction motor/generator torques.

5. The shift control system as claimed in claim 4, wherein the hybrid transmission further comprises at least one of a brake which is capable of fixing one of rotational elements of the differential mechanism and a clutch which is capable of connecting two of the rotational elements, and varies a speed ratio of the hybrid transmission by controlling engagement and disengagement of at least one of the brake and the clutch, wherein the motor torque correcting section is configured to decrease the output power of the engine by decreasing the target engine torque and by slippingly engaging one of the brake and clutch.

6. The shift control system as claimed in claim 4, wherein, in the third correction operation, the motor torque correcting section calculates the excessive regenerative electric power over the rated power of the motor/generators from the second-correction motor/generator torques and corrects the target engine torque so as to downwardly correct the second-correction motor/generator torque of the motor/generator put in a regenerative state so as to limit the excessive regenerative electric power within a regeneration enabling electric power.

7. The shift control system as claimed in claim 4, further comprising a battery condition detecting section which detects a storage state of the battery.

8. The shift control system as claimed in claim 4, wherein the preset engine speed value is a value obtained by subtracting a predetermined margin from an upper limit of the engine speed.

9. The shift control system as claimed in claim 4, further comprising a vehicle driving condition detecting section which detects the accelerator opening, the vehicle speed and a state-of-charge condition of the battery.

10. The shift control system as claimed in claim 4, wherein the shift control system further comprises the hybrid transmission including the motor/generators and the differential mechanism which includes a planetary gear mechanism.

11. The shift control system as claimed in claim 10, wherein the planetary gear mechanism comprises:

a first rotational element connected with a first motor/generator which is a first one of the two motor/generators;

a second rotational element connected with an input member to be connected with the internal combustion engine;

a third rotational element connected with the output shaft; and a fourth rotational element connected with a second motor/generator which is a second one of the two motor/generators.

* * * * *